(12) United States Patent
e Costa

(10) Patent No.: US 10,839,426 B2
(45) Date of Patent: Nov. 17, 2020

(54) SYSTEMS AND METHODS FOR MANAGING DIGITAL ADVERTISING CAMPAIGNS IN A NETWORK OF MOVING THINGS, FOR EXAMPLE INCLUDING AUTONOMOUS VEHICLES

(71) Applicant: Veniam, Inc., Mountain View, CA (US)

(72) Inventor: Rui Miguel Correia e Costa, Sintra (PT)

(73) Assignee: VENIAM, INC., Mountain View, CA (US)

( * ) Notice: Subject to any disclaimer, the term of this patent is extended or adjusted under 35 U.S.C. 154(b) by 144 days.

(21) Appl. No.: 15/414,978

(22) Filed: Jan. 25, 2017

(65) Prior Publication Data

US 2018/0053215 A1 Feb. 22, 2018

Related U.S. Application Data

(60) Provisional application No. 62/377,872, filed on Aug. 22, 2016.

(51) Int. Cl.
*G06Q 30/00* (2012.01)
*H04W 64/00* (2009.01)
(Continued)

(52) U.S. Cl.
CPC ..... *G06Q 30/0266* (2013.01); *G06Q 30/0267* (2013.01); *H04W 4/42* (2018.02);
(Continued)

(58) Field of Classification Search
None
See application file for complete search history.

(56) References Cited

U.S. PATENT DOCUMENTS 8,984,147 B1* 3/2015 Kret ............... G06F 16/9535
709/228
10,317,900 B2* 6/2019 Kamhi ............... B60W 50/14
(Continued)

OTHER PUBLICATIONS

Ankit Banerjee, All You Need to Know About Tethering With Your Android Device, Oct. 17, 2013, www.androidauthority.com (Year: 2013).*

*Primary Examiner* — Naresh Vig
(74) *Attorney, Agent, or Firm* — McAndrews, Held & Malloy, Ltd.

(57) ABSTRACT

Communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, various aspects of this disclosure provide communication network architectures, systems and methods for managing digital advertising campaigns in a network of moving things (e.g., including manually operated and/or autonomous vehicles, etc.). As a non-limiting example, vehicle mobility and/or context may be utilized to effectively distribute and control distribution of ad campaigns. Additionally, various aspects of this disclosure provide systems and methods by which such ad campaigns may be specified (or defined) by a user.

32 Claims, 15 Drawing Sheets

(51) Int. Cl.
  *G06Q 30/02*  (2012.01)
  *H04W 4/44*  (2018.01)
  *H04W 4/42*  (2018.01)
  *H04W 84/18* (2009.01)
  *H04W 88/08* (2009.01)

(52) U.S. Cl.
  CPC ............ *H04W 4/44* (2018.02); *H04W 64/006* (2013.01); *H04W 84/18* (2013.01); *H04W 88/08* (2013.01)

(56) References Cited

U.S. PATENT DOCUMENTS

| | | | |
|---|---|---|---|
| 2007/0050248 A1* | 3/2007 | Huang | G06Q 30/02 |
| | | | 705/14.62 |
| 2012/0054028 A1* | 3/2012 | Tengler | G01C 21/3697 |
| | | | 705/14.49 |
| 2012/0185334 A1* | 7/2012 | Sarkar | G06Q 30/0251 |
| | | | 705/14.58 |
| 2014/0244385 A1* | 8/2014 | Choi | G06Q 30/0261 |
| | | | 705/14.52 |
| 2015/0348112 A1* | 12/2015 | Ramanujam | G06Q 30/0266 |
| | | | 705/14.63 |
| 2017/0032402 A1* | 2/2017 | Patsiokas | G06Q 30/0207 |
| 2019/0090174 A1 | 3/2019 | Rocci et al. | |

* cited by examiner

SYSTEMS AND METHODS FOR MANAGING DIGITAL ADVERTISING CAMPAIGNS IN A NETWORK OF MOVING THINGS, FOR EXAMPLE INCLUDING AUTONOMOUS VEHICLES

CROSS-REFERENCE TO RELATED APPLICATIONS/INCORPORATION BY REFERENCE

This patent application makes reference to, claims priority to, and claims benefit from U.S. Provisional Patent Application Ser. No. 62/377,872, filed on Aug. 22, 2016, and titled "Systems and Method for Managing Digital Advertising Campaigns in a Network of Moving Things," which is hereby incorporated herein by reference in its entirety.

The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
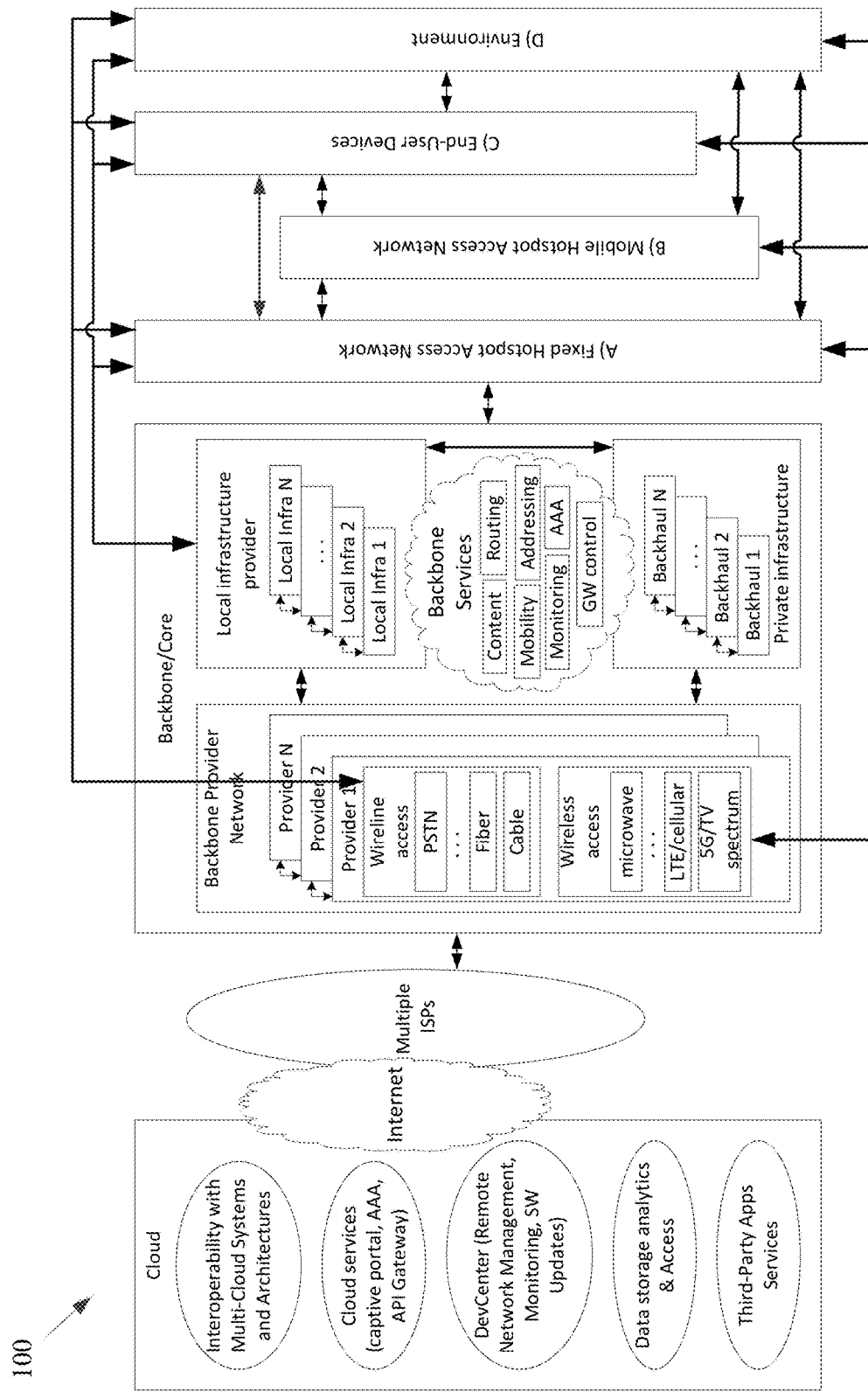
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, various aspects of this disclosure provide communication network architectures, systems and methods for managing digital advertising campaigns in a network of moving things (e.g., including manually operated and/or autonomous vehicles, etc.). As a non-limiting example, vehicle mobility and/or context may be utilized to effectively distribute and control distribution of ad campaigns. Additionally, various aspects of this disclosure provide systems and methods by which such ad campaigns may be specified (or defined) by a user.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then be sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, networks and/or network components 200-1500, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-party applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
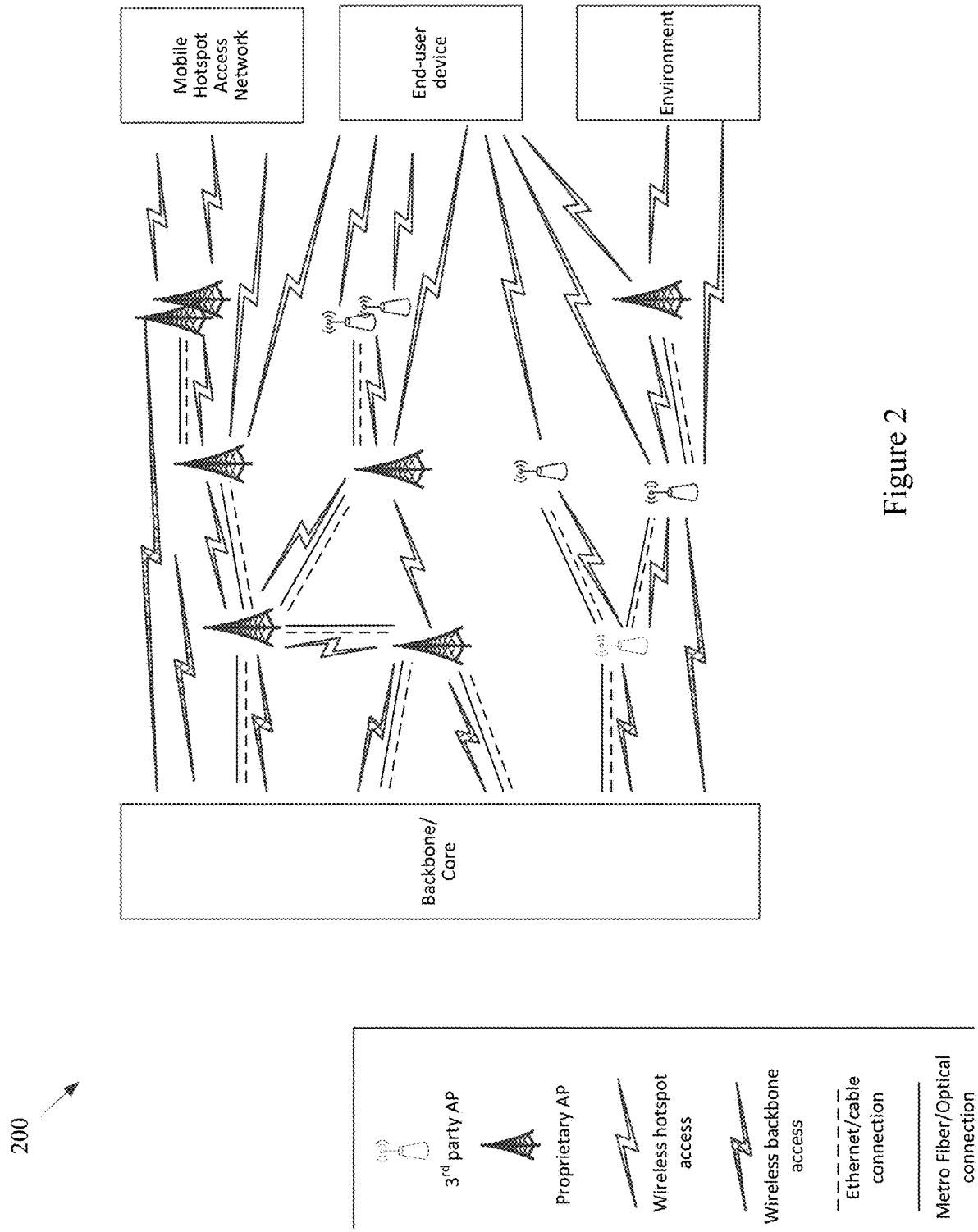
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, networks and/or network components 100 and 300-1500, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
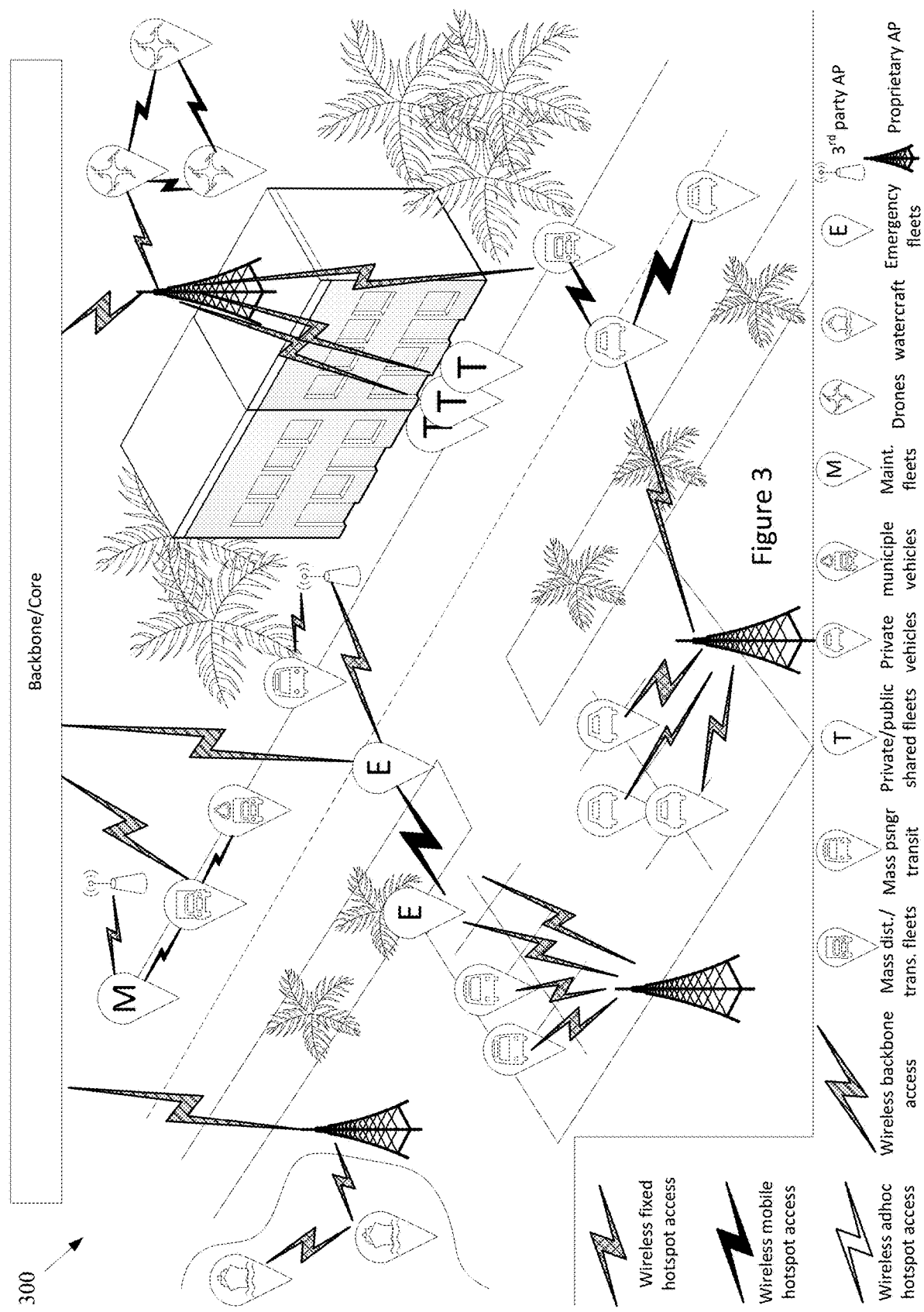
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, networks and/or network components 100-200 and 400-1500, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
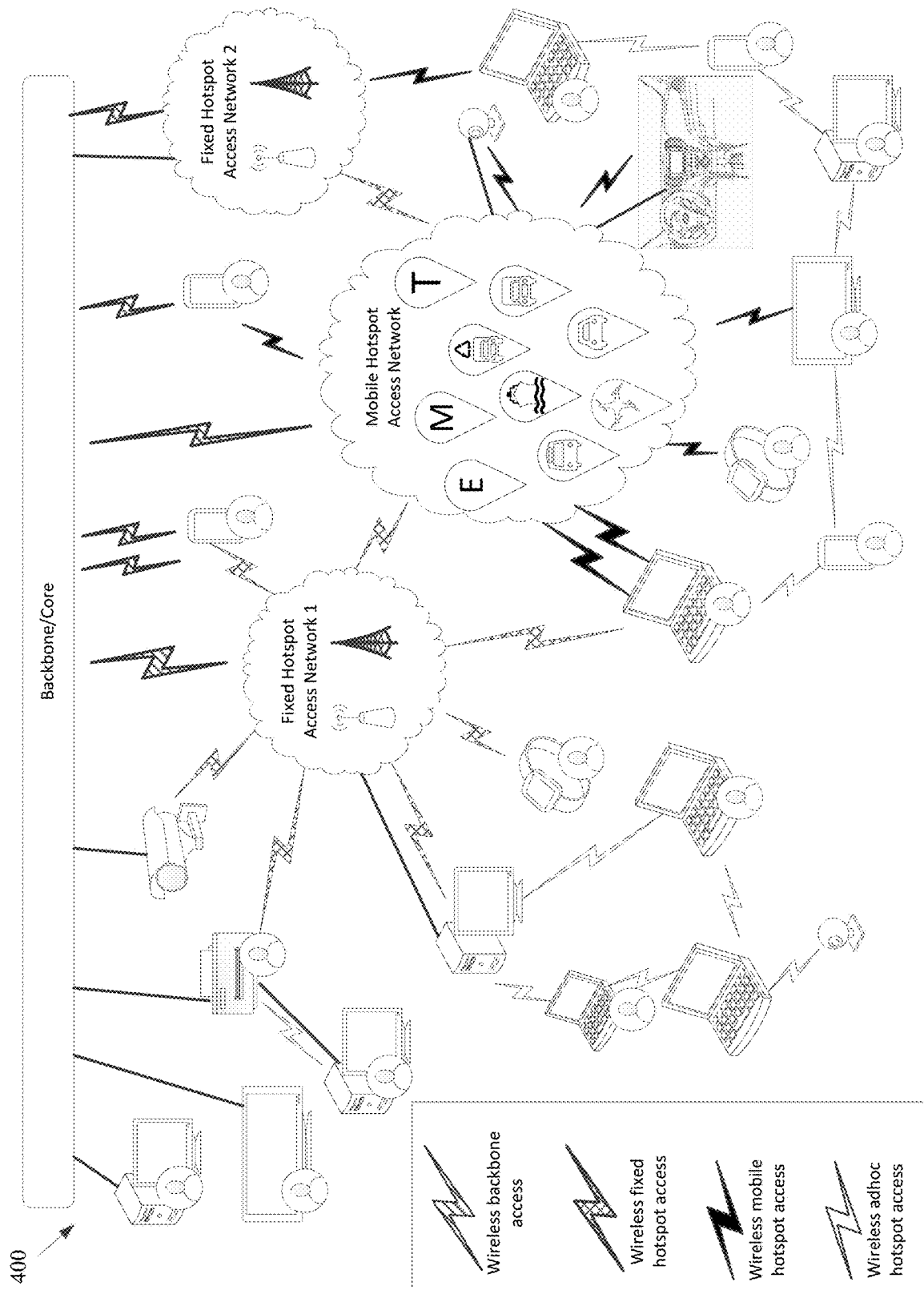
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, networks and/or network components 100-300 and 500-1500, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

The example network 100 illustrated in FIG. 1 has a flexible architecture that is adaptable at implementation time (e.g., for different use cases) and/or adaptable in real-time, for example as network components enter and leave service.

Figure 5A:
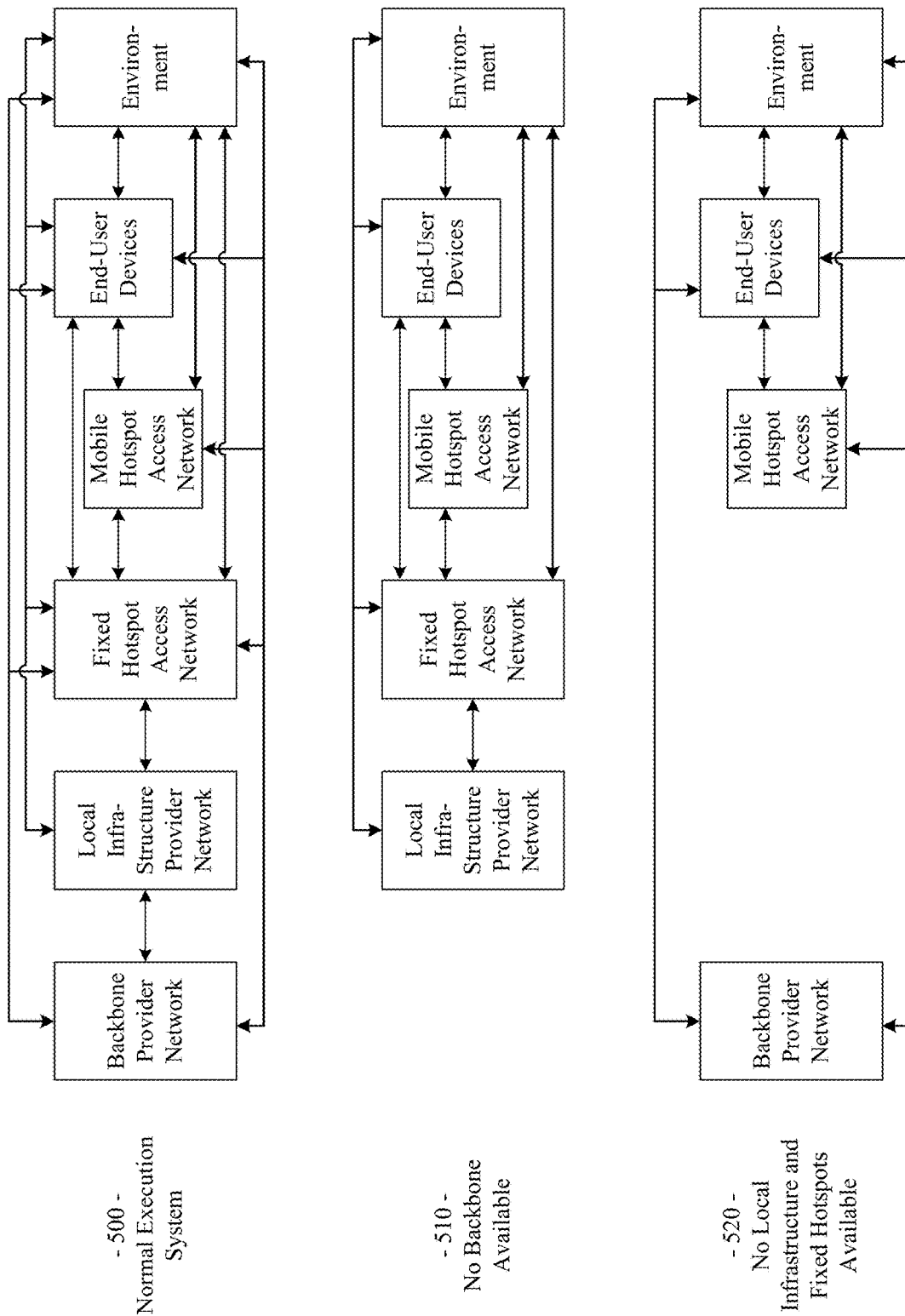
FIGS. 5A-5C show a plurality of network configurations illustrating the flexibility and/or and resiliency of a communication network, in accordance with various aspects of this disclosure.
Figure 5B:
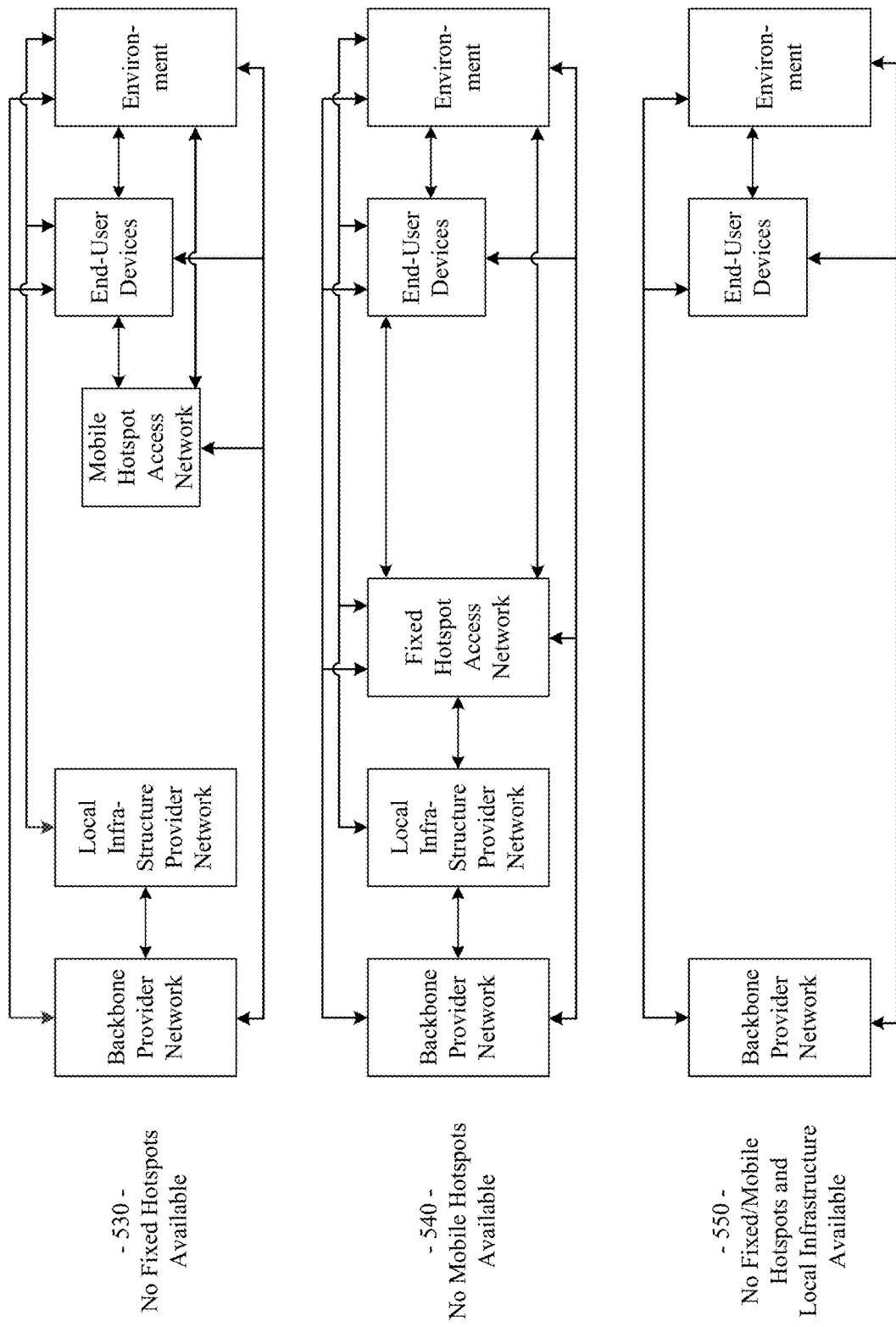
Figure 5C:
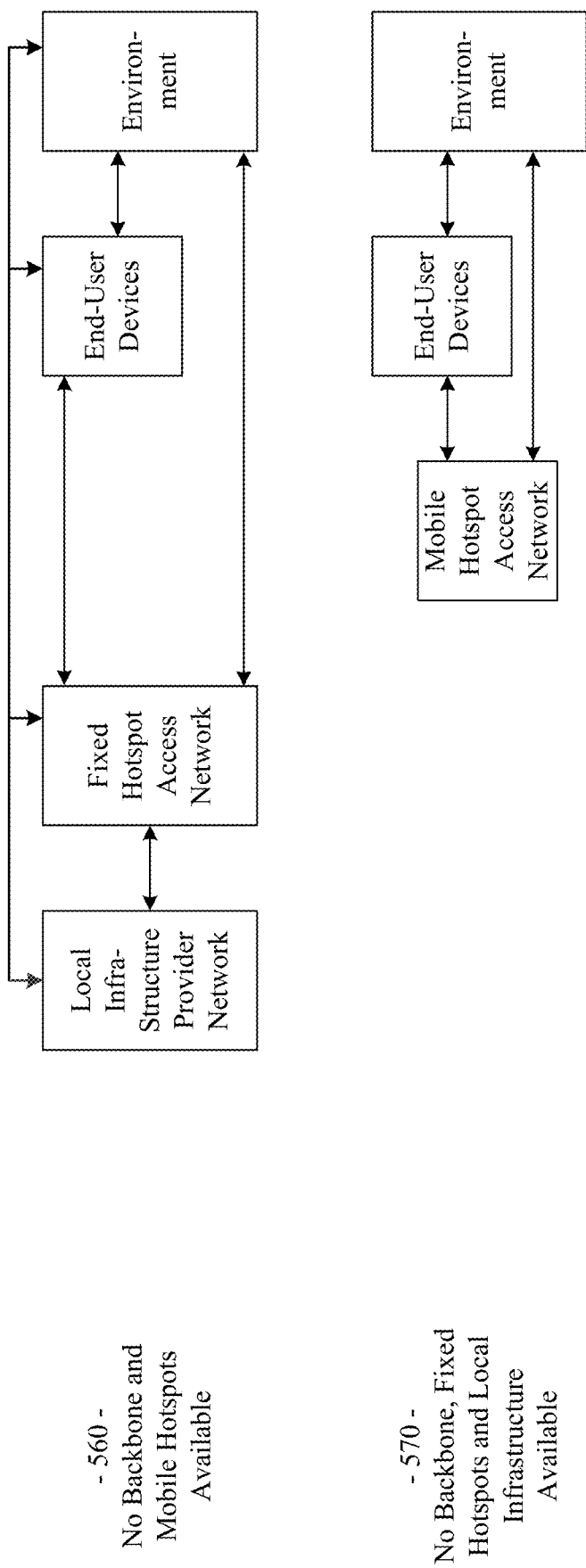

FIGS. 5A-5C illustrate such flexibility by providing example modes (or configurations). The example networks 500-570 may, for example, share any or all characteristics with the other example methods, networks and/or network components 100-400 and 600-1500, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
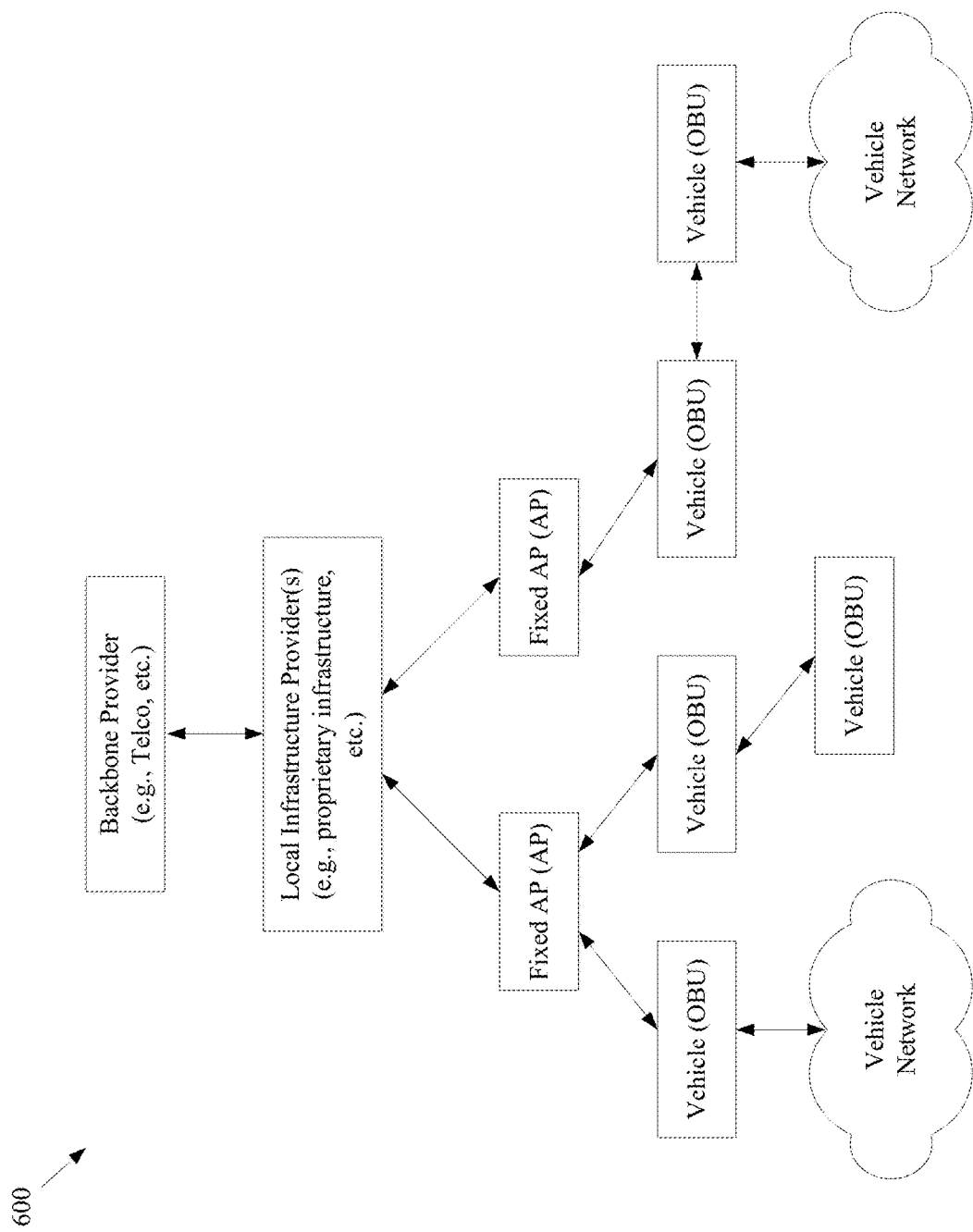
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, networks and/or network components 100-500 and 700-1500, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

Various aspects of the present disclosure present example systems and methods for managing digital advertising campaigns, for example including communication and presentation aspects thereof. Such example systems and methods are presented merely to illustrate various aspects of the present disclosure, but the scope of this disclosure should not be limited by particular characteristics of such example systems and methods.

With the trend to replace various types of fixed and static advertising (or ad) content with dynamic digital ad content, for example using screens as advertising channels (or conduits), there's a need to improve how advertising campaigns are run (e.g., distributed, presented, etc.). Some distribution channels for advertising may, for example, include moving vehicles, such as buses, trains (or metros), taxis, shared vehicles, watercraft, aircraft, etc., which already contain multiple static ad campaigns, both in the interior and on the exterior. Other distribution channels for advertising may, for example, include displays outside of the vehicle (e.g., electronic billboards, general freestanding and stationary information displays such as MUPIs (Mobilier Urbain Pour Information), etc.). Some advertising campaigns are now equipping those same spaces with digital screens to run digital advertising, which presents new challenges. Some of such challenges, for example, include managing the distribution of digital advertising campaigns in all the new digital screens (e.g., at scale) and leveraging the unique characteristics of a moving asset.

At present, content management systems for managing, distributing, and/or presenting digital advertising campaigns are unable to, or unable adequately to, among other things:

Create and distribute digital advertising campaigns across multiple mobile assets in a cost-effective way;
Leverage the unique context of the mobile asset to trigger campaigns (e.g., run a campaign whenever a vehicle is in the vicinity of a transit station, run a campaign whenever a vehicle is passing by another vehicle, etc.);
Run large-scale synchronized campaigns in multiple devices and/or epidemically distribute content as the asset moves, even for example when no cellular infrastructure is available; and/or
Create a system that by using mobile assets to distribute digital advertising campaigns, reduces the installation cost of digital screens inside and outside vehicles as well as at fixed exterior locations.

Accordingly, various aspects of the present disclosure provide systems and methods for creating and managing digital advertising campaigns in the multiple channels available within and around moving assets and in general in the Internet of Moving Things (e.g., including manually locally or remotely operated vehicles, autonomous vehicles, etc.).

Various aspects of such systems and methods may, for example, provide Cloud-based portals and systems to create digital advertising campaigns for different distribution channels, for example to be used by advertising agencies. Various aspects of such systems and methods, for example, may also provide Cloud-based portals and systems to create ad campaigns using pre-existing templates and/or by creating new templates for campaigns. Various aspects of such systems and methods may, for example, provide Cloud-based portals and systems to manage existing digital advertising campaigns, allowing advertising agencies to activate, disable, and/or modify existing campaigns. Various aspects of such systems and methods may, for example, additionally allow the ad campaigns to be activated, delivered, and/or displayed utilizing (or leveraging) multiple unique characteristics of the Internet of Moving Things as distribution and display channels for the digital advertising campaigns. Various aspects of such systems and methods may, for example, further provide Cloud-based portals and systems to acquire and make available ad campaign metrics presented as valuable analytics for the advertising agencies and owners of the campaigns. Various aspects of such systems and methods may, for example, also provide Cloud-based portals and systems that easily integrate with existing Content Management Systems (CMS) used currently by advertising agencies.

Various aspects of present disclosure have demonstrated how to deliver high-quality Internet connections over Wi-Fi to and/or through the Internet of Moving Things (IMT). While for example accessing the Wi-Fi service on the vehicle, users can be prompted with a captive portal that varies from a simple "login and accept terms" format to a more complex format that includes space to run targeted ad campaigns to specific audiences (e.g., to specific users, to passengers of a vehicle, to users near or within a range of a vehicle, etc.). Campaigns can also be displayed in digital advertising screens placed in the interior and/or on the exterior of the vehicles (e.g., bus kings, scrolling text displays, seat back displays, ceiling displays, floor displays, etc.). Campaigns may additionally be distributed to and/or displayed on screens located in the vicinity of the vehicle's current position or along the vehicle's route (e.g., billboards, MUPIs, etc.).

Various aspects of the present disclosure provide a platform for distributing digital advertising campaigns to up to thousands of moving vehicles and collecting relevant analytics about the advertising audience. Also for example, additional examples of systems and methods for providing content (e.g., multimedia content, etc.) in a Network of Moving Things are presented in U.S. Provisional Application Ser. No. 62/376,937, titled "Systems and Methods to Improve Multimedia Content Distribution in a Network of Moving Things," filed on Aug. 19, 2016, the entire contents of which are hereby incorporated herein by reference.

Various aspects of the present disclosure concern portals and systems whereby advertising agencies (or users) may create and manage campaigns and configure the several features of such campaigns, allowing them to setup the digital advertising campaigns through for example a WYSIWYG (What You See Is What You Get) interface, schedule and define the campaigns according to geographic and other parameters (e.g., vehicle context parameters, etc.), etc. Campaigns may, for example, be distributed utilizing a plurality of different distribution models (e.g., ad-hoc, predictive, predictive epidemic, etc.), examples of which are described herein. Additionally, the ability to create and control campaigns may be actionable through APIs, for example available through the Cloud (e.g., accessible to networked computing systems or servers communicatively coupled to the Cloud, etc.).

The discussion herein utilizes various terms, examples of which include:

Campaign Display Channel (CDC): Generally refers to a location (or device) where the campaign is displayed to the end user (or target audience). Each CDC contains several unique properties, for example including: display size, type of functionalities available, type of data available, existence or not of sound and/or other forms of media, wireless interface characteristics (e.g., communication protocols supported, proprietary interface characteristics, security features, etc.), etc.

Portal: Generally refers to rich media (text, images, videos, audio, etc.) content, for example with different wireframes, adapted to one or more of the several display channels.

Digital Advertising Campaign (DAC): Generally refers to the selection of one or more Portals to be displayed within a certain context.

Campaign Display Filters (CDF): Generally refers to the context(s) in which the DACs (or portions thereof) should be displayed.

Mobile Digital Advertising Content Management System (MDA-CMS): Generally refers to a cloud-based portal where the user is able to create portals, create/activate/deactivate/delete/modify DACs and CDFs, access digital advertising analytics, etc.

Campaign Key Insights (CKI): Generally refers to various relevant metrics and analytics about the campaign performance.

Note that such definitions are merely examples utilized herein in the context of various example systems and methods. The scope of the present disclosure should not be limited by such definitions.

In accordance with various aspects of the present disclosure, a user is able to log into a Cloud-based portal where the user will have the ability to, among other things, browse existing DACs that may be in any of a variety of respective states. Such states may, for example, include:

Active: Generally refers to campaigns that are either active at the moment (running) or will be active in the future (upcoming);

Available: Generally refers to campaigns that were not previously activated but can be selected and made active in the future; and Past: Generally refers to campaigns that were already distributed and displayed but that are no longer active.

Campaigns may, for example, be defined for specific types of users. Campaigns may, for example, be filtered by:

Vnetwork: which vehicular network (or network portion) are they part of;

Client: the unique client ID;

Vehicle type: In (or near) what type of vehicle should the campaigns be distributed and/or displayed (e.g., only apply this campaign to buses, present the campaign in/on trains and buses, etc.); and Percentage (or portion) of the fleet: Optionally a campaign may for example be applied only to a percentage of the fleet (e.g., a random portion of a fleet, a portion of a fleet generally serving a particular geographical area or campus, etc.). Note that individual displays in (or on or near) a vehicle may be treated independently, for example each with different respective ad content and/or presentation criteria.

Campaign Display Filters (CDFs) may, for example, be defined according to any one or more of a variety of factors. Example factors include:

1) Time of the Day and/or Day of the Week:
   a. For example, ad content may be filtered based on time/day versus business hours of an enterprise associated with an advertisement, during commuting times or rush hours, etc.
   b. Also for example, ad content may be filtered based on actual time of day (or day of week, time of year, type of day, etc.) and typical time of day (or day of week, time of year, type of day, etc.) at which advertised goods and services are purchased or at which purchasing decisions are made.

2) Geography and Location:
   a. For example, ad content may be borough limited, neighborhood limited, city limited, block limited, bus/subway-line limited, bus or train stop limited, etc.
   b. Also for example, ad content may be limited to a custom geographic area, for example based on a radius from a specific location (e.g., from a bus station, transit center, etc.), based on bordering streets, based on any geometric shape that may for example be defined by geographic coordinates, etc.

3) Direction of Travel:
   a. For example, ad content may be provided on buses traveling toward (or away from) an enterprise or event, on billboards or MUPIs located near an enterprise or event or location toward (or away from) which a vehicle is traveling, along a route utilized by people traveling toward (or away from) an enterprise or event, etc.
   b. The direction of travel may, for example, be actual and/or may be a planned or anticipated direction of travel (e.g., a bus route, a taxi navigation path, etc.).

4) Speed
   a. For example, ad content may be automatically shut down (e.g., advertising display (or display default) on external screens of a vehicle, etc.) if the vehicle is moving at a speed more than a preset maximum, for example to enhance road safety.
   b. Also for example, ad content might only be displayed on the outside of a vehicle when the vehicle is stopped and/or when vehicle speed is steady.

5) Proximity with other Vehicles (e.g., of a Same Type, Different Types, etc.)
   a. For example, a same campaign running in the vehicle may be automatically shown on the other side of the road (or in a vicinity of the vehicle) at the interior and/or exterior screens of another vehicle, for example to maximize impressions (or exposures).

6) Proximity to Transit Stations
   a. Campaigns targeting riders at specific transit stations may for example be run, along with transit information such as connecting routes, subways, shuttles or ferries, as well as promotional campaigns for local services.

7) Synchronized Large Scale Advertising Delivery
   a. Large scale brand campaigns may for example be delivered to the entire fleet of vehicles (or multiple fleets and/or to users thereof) with the same ad content at all screens inside and/or outside the vehicles at the same time of day.

8) Multiple Campaign Management
   a. Different campaigns may be managed at the same time depending on the line, vehicle location, specific vehicle or fleet, specific vehicle screen, etc.

9) Vehicle Vicinity Awareness
   a. For example, content for a campaign may be presented (e.g., displayed, etc.) on external screens of a vehicle facing the sidewalk and not the road. For example, content may be presented on a first exterior display of a bus that faces (and/or is immediately adjacent to) a sidewalk or patio, but not on a second exterior display of the bus facing lanes of traffic.
   b. Also for example, ad content for a campaign may be presented (e.g., displayed, etc.) whenever a vehicle is at a red light (and/or only when the light is red) or stop sign. For example, when a light turns green, the vehicle may cease presenting ad content on an exterior display (or on an exterior display that faces vehicle traffic).
   c. Specific campaigns may for example be presented (e.g., displayed, etc.) whenever a vehicle is approaching a given location.
   d. A campaign may, for example, be presented (e.g., displayed, etc.) whenever a vehicle is at a specific location or service event.
   e. A campaign may, for example, be presented (e.g., displayed, etc.)

whenever a vehicle is passing by another vehicle (e.g., synchronized or context aware campaigns). For example, a first bus may present ad content on an exterior display facing a second bus that is passing the first bus.

Various aspects of the present disclosure provide for a user to have the ability to create multiple resources, namely:

Create a Portal: A user may select the design for the several CDCs from a group of templates of wireframes or create a new one. For example, a user may use a WYSIWYG interface to customize colors, text, add images and/or videos to the several placeholders. After Portals are created, they may then be added to the Portal gallery.

Create a CDF: A user may create a filter that contains one or more of the filters discussed herein with specific characteristics (e.g., select a geographical location or area from a map, define a specific range of time-of-day, identify displays and/or vehicle context parameters associated with the use of particular displays, etc.).

Create a DAC: Compose a campaign by selecting which Portals are going to be active from the Portal gallery and apply a specific CDF.

The user may also, for example, browse Campaign Key Insights (CKIs) (or metrics) for each campaign, that include some or all of the following metrics, depending on the selected Portals and CDCs for each campaign, for example:

Number of views/contacts, number of displays, total time of display for all or each type of display, etc.;
Type of audience;
User profile;
User demographics; and
etc.

In an example implementation, APIs are provided to a user for interaction with the systems. Non-limiting examples of such APIs include APIs performing the following functionalities:

Create/Get/Modify/Delete Portal
Create/Get/Modify/Delete CDF
Create/Get/Modify/Delete DAC
Get Analytics Any one or more of a variety of Distribution Channels may be utilized. Examples of Distribution Channels and examples of digital advertisements may, for example, include:

Vehicle Interior onboard displays: Digital screens placed inside the vehicles, for example ceiling-mounted or hanging displays, seat back displays, floor displays, etc.
  a. Examples: display useful information for riders including ETA, next stop, weather information, news, as well as HD Video ads;

Vehicle Exterior displays: Digital screens installed outside the vehicles facing the sidewalk and road, front and/or rear, etc.
  a. Examples: Displaying information to citizens in the vicinity of the bus;

Splash Pages: Page prompted whenever a user uses a mobile device to connect to a Wi-Fi network offered inside or around the vehicle.
  a. Examples: Displaying splash page with targeted advertising, ask for registration, login with credentials etc.

Fixed Exterior displays: Fixed digital screens in the vicinity of the vehicle
  a. Examples: Digital billboards, digital MUPIs (or muppies), etc.

Another example implementation involving the creation of a campaign and various types of setups (e.g., one in an ad-hoc model, another in a predictive model, and yet another in a predictive epidemic model, etc.) will now be presented. It should be noted that any example presented herein may share any or all characteristics with any other one or more examples presented herein.

Note that generally, any or all of the communication, decision-making, interfacing, display controlling, etc., discussed herein may be performed by a Mobile AP (or OBU) of a vehicle (e.g., an autonomous vehicle, a manually locally or remotely controlled vehicle, etc.). Any or all of the functionality (or any portion thereof) may also be performed by various other nodes discussed herein (e.g., Fixed APs, Network Controllers, Cloud Servers, Network Operation Centers or Dashboards, Display Systems like billboard systems, MUPI systems, vehicle interior or exterior display systems, etc.).

Any of a variety of types of metadata about an ad campaign may be sent to the vehicles (e.g., a Mobile AP or OBU thereof) or any node (e.g., a Fixed AP, an intelligent display, a user device, a Network Controller, a Cloud server, etc.). Such metadata may, for example, comprise:

1. CAMPAIGN_ID: Sequential unique number that identifies the campaign
2. CAMPAIGN_NAME: Human-readable name for the campaign
3. CAMPAIGN_URL: Address where the campaign is located
4. CAMPAIGN_CONTENT_LOCATION: Where the static files of the campaign are stored (e.g., May use CDN (e.g., a Content Delivery Network) or another server)
5. CAMPAIGN_PORTAL_TYPE: For example, at least one of the CDCs:
   a. VEHICLE_INDOOR_DISPLAY: select one of the following
      i. ALL
      ii. <vehicle_indoor_display_id>
      iii. List of <vehicle_indoor_display_ids>
      iv. etc.
   b. VEHICLE_OUTDOOR_DISPLAY: select one of the following
      i. ALL
      ii. <vehicle_outdoor_display_id>
      iii. List of <vehicle_outdoor_display_ids>
      iv. etc.
   c. SPLASH_PAGE
   d. FIXED_OUTDOOR_DISPLAY: select one of the following
      i. ALL
      ii. <fixed_outdoor_display_id>
      iii. List of <fixed_outdoor_display_ids>
      iv. etc.
6. CAMPAIGN_CONTENT_CACHE: States if the content of the campaign should be cached locally or always downloaded from CAMPAIGN_CONTENT_LOCATION
7. CAMPAIGN_DISPLAY_FILTER (CDF) or list of CAMPAIGN_DISPLAY_FILTERs (CDFs):
   a. CAMPAIGN_GEO
   b. CAMPAIGN_START_TIME
   c. CAMPAIGN_DURATION
   d. CAMPAIGN_END_TIME
   e. CAMPAIGN_MIN_SPEED
   f. CAMPAIGN_MAX_SPEED
   g. CAMPAIGN_VICINITY_FILTER
   h. etc.

Note that the scope of this disclosure should not be limited by the characteristics of such specific examples.

In an example scenario, a user may create (or define) a campaign as follows:
1. User logs into MDA-CMS.
2. User creates and configures a new Portal.

3. User creates and configures a new CDF.
4. User creates and configures a new DAC.
5. User activates a DAC.

Figure 7:
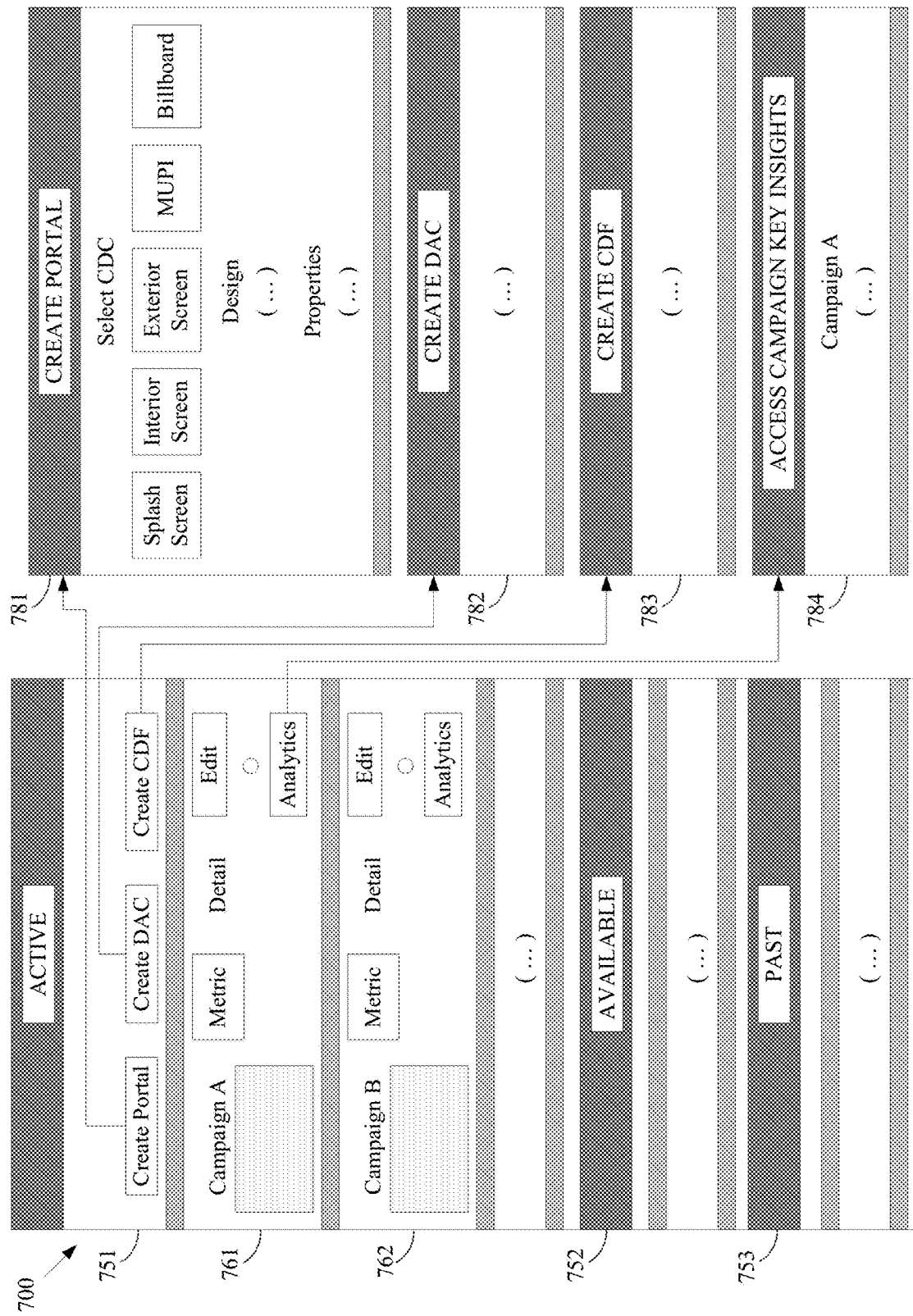
FIG. 7 shows a diagram of an example advertisement communication network, in accordance with various aspects of the present disclosure.

FIG. 7 shows a diagram of various example user interface features for creating and/or managing advertising campaigns, in accordance with various aspects of the present disclosure. Such user interface (U/I) functionality may, for example, be provided by one or more Cloud APIs, which may be accessible to a user via the Internet, via a proprietary network, via a secure network, etc. The example user interface features of FIG. 7 may, for example, share any or all characteristics with the other example methods, networks and/or network components 100-600 and 800-1500, discussed herein.

As discussed herein, ad campaigns may have various states, for example an active state, an available state, a past state, etc. Note that the scope of this disclosure is not limited to the example states presented herein. The example 700 shows a user interface screen (or window, etc.) with a Graphical User Interface (GUI) showing various characteristics of active, available, and/or past campaigns. A user interface button (e.g., "Create Portal") is provided to create a portal, which when pressed, presents the user with a screen (or window, etc.) GUI 781 for creating (or defining) a Portal. Also, a user interface button (e.g., "Create DAC") is provided to create a DAC, which when pressed, presents the user with a screen (or window) GUI 782 for creating (or defining) a DAC. Additionally, a user interface button (e.g., "Create CDF") is provided to create a CDF, which when pressed, presents the user with a screen (or window) GUI 783 for creating (or defining a CDF). Further, a user interface button (e.g., "Analytics") is provided (e.g., for each campaign, for a group of campaigns, for all campaigns, etc.) to access analytical information, which when pressed, presents the user with a screen (or window, etc.) GUI 784 for accessing the various analytics (or metrics), for example CKIs, by which the user may monitor operation of a campaign. In the example 700, a user is provided with a button (e.g., "Campaign A," "Campaign B," etc.) for each campaign (e.g., for each active campaign, for each available campaign, for each past campaign, for each campaign that in the process of being defined or redefined, etc.) with which the user may access the respective CKIs for the campaign, with which the user may edit the campaign, etc.

As discussed herein, various ad content distribution models may be utilized (or specified) by a user, for example exclusively, in combination with other models, etc. Examples of such distribution models include:
1. Ad-hoc Distribution Model:
   a. A vehicle periodically requests which campaigns are available for it in the next delta period of time.
   b. A campaign list is sent to the vehicle with the given CDFs.
   c. The vehicle will show/make available each campaign depending on the local interpretation of the CDFs.
2. Predictive Model:
   a. Whenever an ad campaign is created, the MDA-CMS will notify the MDA-GW (e.g., MDA Gateway, etc.) that a new ad campaign is available for a specific set or subset of vehicles.
   b. The MDA-GW (or other information distribution system) is aware of all vehicle addresses and sends the ad campaign data to every vehicle (or every vehicle of the set or subset) that is online.
   c. The MDA-GW will keep trying to send the ad campaign to each vehicle (or each vehicle of the set or subset) until the entire fleet is updated.
3. Predictive Epidemic Model:
   a. Whenever an ad campaign is created, the MDA-CMS will notify the MDA-GW that a new ad campaign is available for a specific set or subset of vehicles.
   b. The MDA-GW (or other information distribution system) selects a portion (or percentage) of the vehicles in the set or subset and sends the campaign data to every vehicle of the selected portion that is online.
   c. The MDA-GW will also send a list of the vehicle set or subset to each vehicle.
   d. Vehicles will then distribute the campaign to vehicles within the provided set or subset using an epidemic algorithm. Each vehicle notifies the MDA-GW whenever it has received an ad campaign with success.
   e. If after a predefined period of time, 100% of the fleet does not have the campaign, the MDA-GW will try to send the campaign directly to the missing vehicles and/or notify the MDA-CMS that not all vehicles have completed downloading the campaign. For example, the MDA-GW may fall back to a Predictive model or other model, if the Predictive Epidemic model is not meeting campaign delivery requirements.

After the vehicle (or other node) has successfully downloaded the campaign, the system may provide the ad content in various manners, non-limiting examples of which are provided herein. For example:
1. Depending on the CAMPAIGN_PORTAL_TYPE, the system may have a different respective behavior. For example:
   a. If a VEHICLE_INDOOR_DISPLAY or VEHICLE_OUTDOOR_DISPLAY:
      i. If the display has a storage mechanism, the system may send the content to the display whenever the CDF applies and/or may pre-send the content to the display so that the display may merely be triggered when the CDF applies.
      ii. If the display is merely connecting to the vehicle and using the vehicle as a media server, the vehicle may display/serve the campaign whenever the CDF applies and the vehicle (e.g., Mobile AP or OBU thereof) sends the display information to the display.
   b. If a SPLASH_PAGE:
      i. A specific campaign may be prompted whenever a user tries to access the Wi-Fi service or the network. As discussed herein, the specific campaign may be a general user campaign, targeted to a particular user or user group, etc.
   c. If a FIXED_OUTDOOR_DISPLAY:
      i. The vehicle may actively scan for the fixed_outdoor_display_id or list of fixed_outdoor_display_ids and may distribute the content (or attempt to distribute the content) if a matching ID is found.
2. Content may, for example, be downloaded and cached in the vehicle (or other node) if CAMPAIGN_CONTENT_CACHE is set to LOCAL.
3. The vehicle may, for example, constantly (or periodically) check the CAMPAIGN_DISPLAY_FILTER, and if one or more filters match, the campaign may be displayed. A default campaign may, for example, be specified for presentation when no filter is matched for a certain period of time.

4. Vehicles may, for example, constantly (or periodically) collect data and provide analytics based on the campaigns. Such data and analytics may, for example, include:
    a. Number of vehicles running the campaign.
    b. Number of screens displaying the campaign.
    c. Number of fixed outdoor displays displaying the campaign.
    d. Number of users exposed to splash page.
    e. Number of users inside a vehicle, or inside a vehicle while a campaign is being presented.
    f. Mixing data from other data sources such as:
        i. People counting cameras.
        ii. Google Analytics.
        iii. Vehicle weight sensors.
        iv. Vehicle position and/or velocity sensors.
        v. Mapping or navigation sources.
        vi. Etc.
5. Analytics and Insights on campaign performance may, for example, be displayed in the MDA-CMS in a variety of forms, including geo-referenced data maps, plots, tables and reports, etc.

Figure 8:
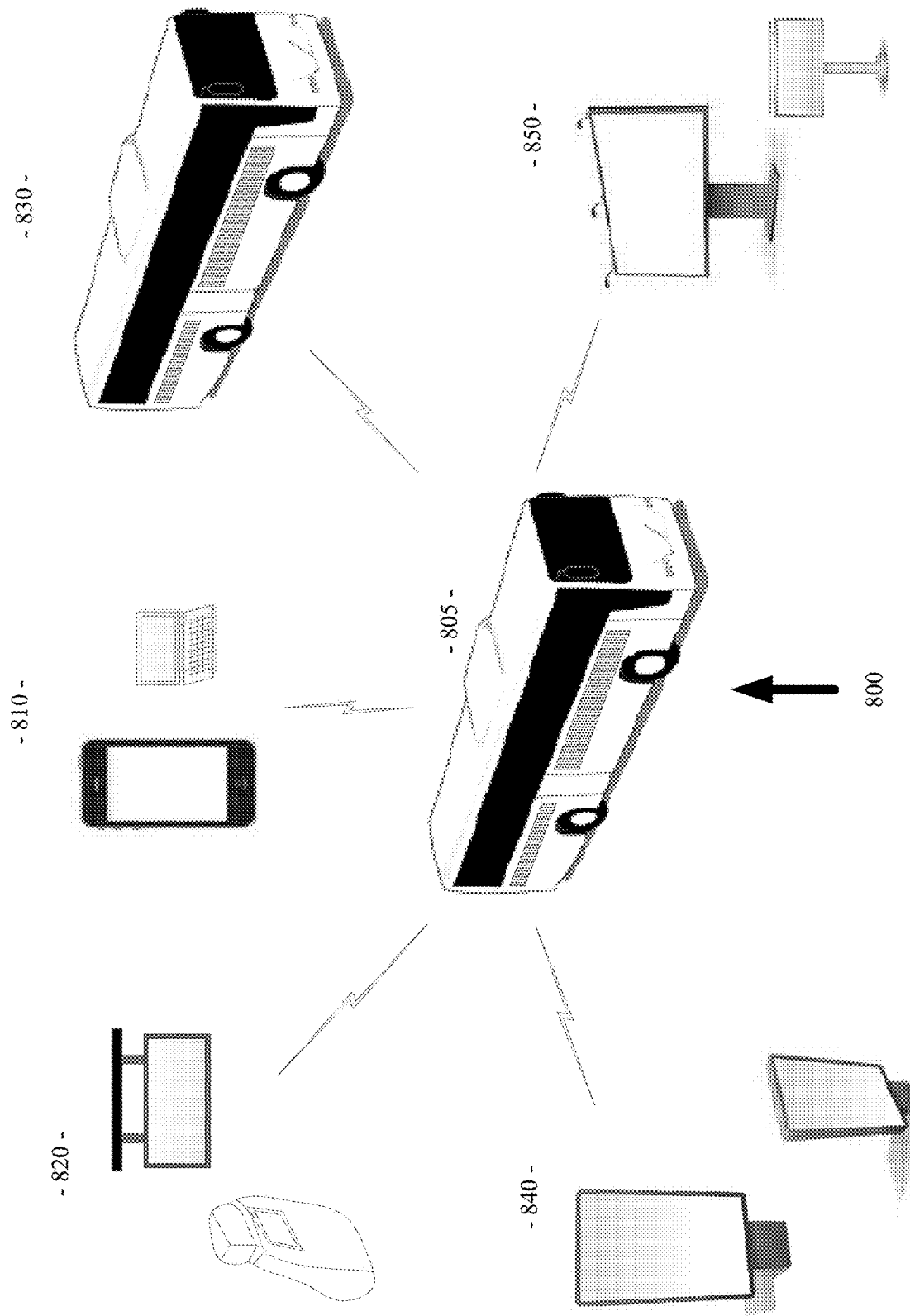
FIG. 8 shows a diagram of an example advertisement communication network, in accordance with various aspects of the present disclosure.
Figure 9:
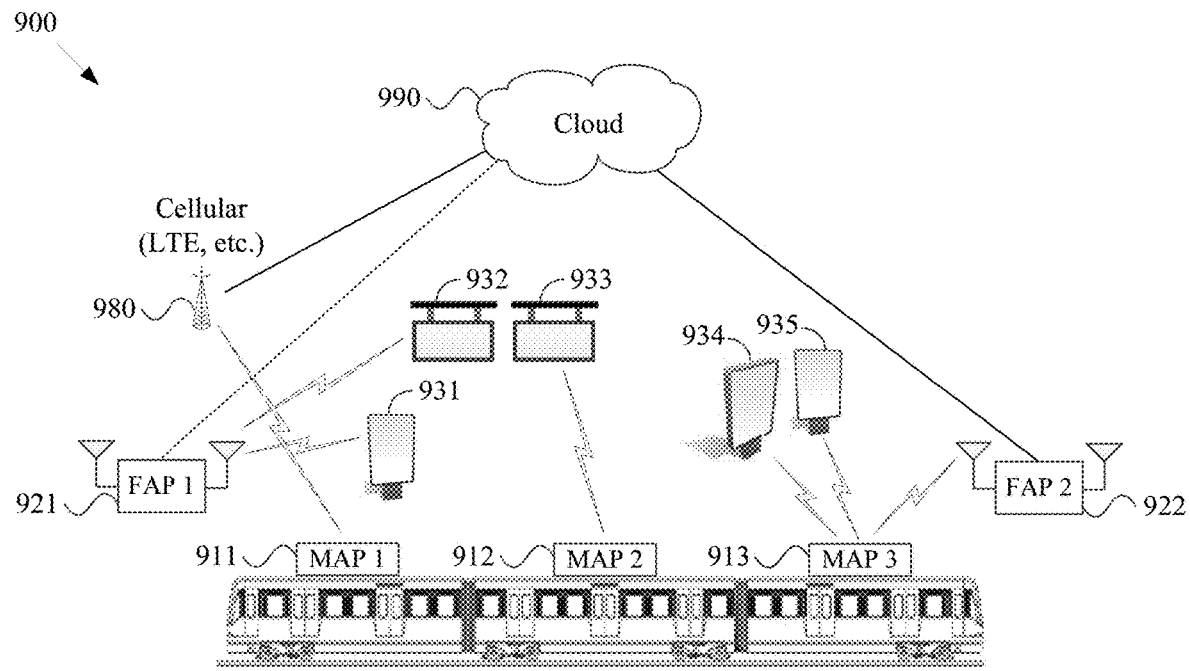
FIG. 9 shows a diagram of an example advertisement communication network, in accordance with various aspects of the present disclosure.
Figure 10:
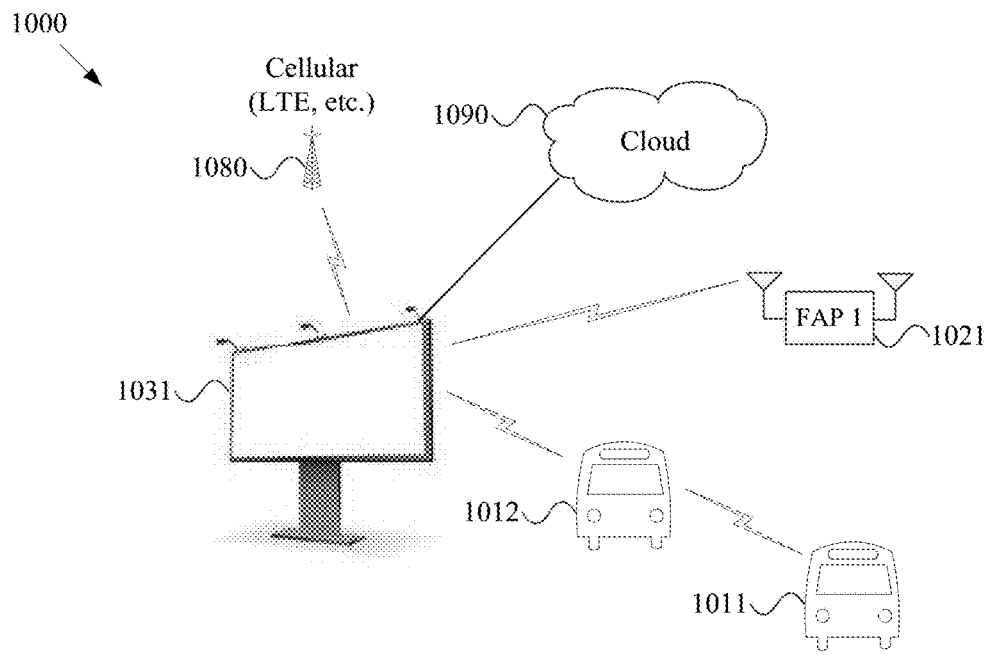
FIG. 10 shows a diagram of various example user interface features for creating and/or managing advertising campaigns, in accordance with various aspects of the present disclosure.

FIGS. 8, 9, and 10 show diagrams of example advertisement communication networks, in accordance with various aspects of the present disclosure. Such diagrams illustrate many of the aspects of the disclosure that are discussed herein. Note that such example networks (or methods or components) may, for example, share any or all characteristics with any or all of the other networks (or methods or components) discussed herein, for example with regard to FIGS. 1-7, FIGS. 10-15, etc.

Referring to the example network 800 shown in FIG. 8, an example of a vehicle 805 or Mobile AP or OBU thereof (e.g., a bus, train, taxi, boat, aircraft, road maintenance vehicle, mail or package delivery vehicle, autonomous vehicle, manually locally or remotely controlled vehicle, etc.) interfaces wirelessly (e.g., utilizing Wi-Fi, Bluetooth, etc.) to deliver the ad content discussed herein to a splash page 810 of a user device (e.g., smart phone, laptop or notebook computer, smart watch, wearable display, smart eyeglasses, etc.) that is utilizing the wireless network access provided to the user by the vehicle 805. For example, when a user device associates with a Mobile AP, the system may utilize the display of the user device to present a 15-second advertisement video to the user. As discussed herein, a CDC may comprise an internal display 820 of the vehicle (e.g., a ceiling mounted or dropdown display, a wall-mounted display, a seatback display, a floor display, etc.), an external display 830 of the vehicle, a MUPI or general stationary information display 840 external to the vehicle (e.g., at a bus stop, train depot, street corner, mall entrance, etc.), a billboard 850, etc.

In another example scenario, the system (e.g., the Mobile AP or OBU, etc.) may communicate advertising content for display on an interior digital screen 820 of the vehicle. Such content may, for example, be communicated and/or presented simultaneously with general information (e.g., next stop information, route information, time information, weather information, etc.).

In another example scenario (e.g., a commuter train, etc., pulling into a station), the system (e.g., the Mobile AP or OBU, etc.) may communicate advertising content for display on all screens (or other media resources) in and/or around the vehicle (e.g., any or all of the CDCs 810-850 shown in FIG. 8, etc. As discussed herein, a respective CDF for an ad campaign may be defined for each of a plurality of CDCs and/or groups thereof.

FIG. 9 also provides an illustrative example of such operation. The example train (or subway) (e.g., with cars having respective Mobile APs 911, 912, and 913) may enter a train station or hub (or stop) and update all of the screens (inside and/or outside of the vehicle). The example train is shown with a plurality of Mobile APs 911, 912, and 913 communicatively coupled (e.g., directly or indirectly) to Fixed APs 921 and 922 and/or cellular (e.g., LTE, etc.) base stations 980, and/or communicatively coupled (e.g., directly or indirectly) to each other. The Fixed APs 921 and 922 and/or cellular base stations 980 may, for example, receive content from the vehicle network in general (or from the Cloud 990). As shown, the Fixed APs 921 and 922 may also communicate ad content with various displays or other media presentation devices.

In the example 900 scenario of FIG. 9, the first MAP 911 is communicatively coupled (e.g., directly or indirectly) to a cellular (or LTE) base station 980 which is communicatively coupled to the Cloud 990, the first FAP 921 is communicatively coupled (e.g., directly or indirectly) to stationary displays 931 and 932, the second MAP 912 is communicatively coupled to a stationary display 933, the third MAP 913 is communicatively coupled (e.g., directly or indirectly) to stationary displays 934 and 935, and the second FAP 922 is communicatively coupled (e.g., directly or indirectly) to the third MAP 913 and the Cloud 990.

For example, the stationary displays 934 and 935 may receive content from the Cloud 990 through the second FAP 922 and the third MAP 913, may receive content stored in the second FAP 922 through the third MAP 913, may receive content stored in the third MAP 913, etc. The stationary display 933 may, for example, receive content stored in the second MAP 912. The stationary displays 931 and 932 may, for example, receive content from the Cloud 990 through the first FAP 921, may receive content stored in the first FAP 921, etc.

Note that the illustrated communication links are merely illustrative and non-limiting. For example, any of the example communication nodes of FIG. 9 may be directly and/or indirectly communicatively coupled with each other. Also note that any or all of the examples displays 931-935 may both receive and transmit ad information (e.g., to and/or from any of the other example nodes (e.g., MAPs, FAPs, etc.).

In another example scenario, a vehicle circulating in a city may update various stationary CDCs (e.g., MUPIs, billboards, etc.) as the vehicle travels by. An example of this is provided at FIG. 8 at items 840 and 850. Another example is provided at FIG. 10, which shows an example network 1000 comprising a plurality of vehicles 1012 and 1011 (e.g., buses, etc., in a same fleet and/or in different respective fleets) in a mobile mesh network, communicating ad content to a stationary media presentation device 1031 (e.g., a display, billboard, etc.) as a vehicle 1012 passes within communication range of such device 1031. Note that the media presentation device 1031 may also, for example, receive information from other nodes of the vehicle communication network (e.g., a Fixed AP 1021, Network Controller, a node of the Cloud 1090, a cellular base station 1080, etc.), for example as a back-up to communication with the vehicle(s) 1012 and 1011.

Note that any or all of the nodes of the example network 1000 may communicate with each other. For example, the Cloud 1090 may communicate ad information (or content) with a cellular base station 1080 and/or a Fixed AP 1021, the cellular base station 1080 and/or Fixed AP 1021 may communicate ad information (or content) with the Mobile APs

1011 and 1021, etc. Also note that the stationary media presentation device 1031 may also function as a server of ad information. In other words, the stationary media presentation device 1031 may pass on ad information to other nodes of the network (e.g., to the Mobile APs 1011 and 1021, to the FAP 1021, to the cellular base station 1080, to a Cloud server 1090, to a user device, to a Network Controller, etc.).

Figure 11:
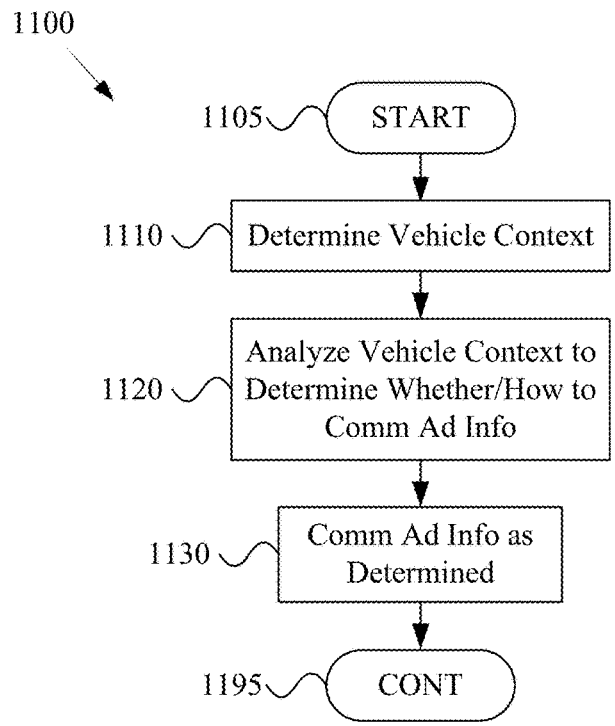
FIG. 11 shows a flow diagram of an example method of communicating advertising information, in accordance with various aspects of the present disclosure.

FIG. 11 shows a flow diagram of an example method of communicating advertising information, in accordance with various aspects of the present disclosure. The example method 1100 may, for example, share any or all characteristics with the other example methods, networks and/or network components 100-1000 and 1200-1500, discussed herein. For example, any or all aspects of the example method 1100 may be performed by a Mobile AP and/or any or all of the nodes discussed herein (e.g., Fixed APs, Network Controllers, cellular base stations, Cloud servers, displays or media presentation devices, user devices, etc.).

The example method 1100 begins executing at block 1105. The example method 1100 may begin executing in response to any of a variety of initiating causes or conditions, non-limiting examples of which are provided herein. For example, the example method 1100 may begin executing in response to a power-up or reset condition, a user command, a command from a Network Controller or other node of a network, a detected environmental condition, etc. Also for example, the example method 1100 may execute periodically and/or continually. Additionally for example, block 1105 may receive execution flow from any other method or method step (or block) discussed herein.

The example method 1100 may, at block 1110, comprise determining a vehicle context. For example, block 1110 may comprise determining the context of a vehicle communicating and/or presenting ad content as discussed herein. Such a vehicle may, for example, comprise any of the types of vehicles discussed herein, for example carrying one or more Mobile APs.

Block 1110 may, for example, comprise determining any or all of the vehicle context parameters discussed herein (e.g., actual or planned location, actual or planned trajectory or route, vehicle orientation, type of vehicle, fleet identification, wireless environment, power supply characteristics, other vehicles (or Mobile APs thereof) within communication range, weather conditions, road conditions, time-of-day, day-of-week, type of day, number of passengers, passenger identities, etc.). Block 1110 may comprise determining the vehicle context in any of a variety of manners. For example, Block 1110 may comprise determining vehicle context based on on-board vehicle sensors or systems, based on information received from other vehicles and/or communication network nodes, based on information received from sensors on-board or off-board the vehicle, based on information received from end user devices, etc.).

Block 1120 may, for example, comprise analyzing the vehicle context determined at block 1110 (e.g., alone or in conjunction with other information) to determine whether and/or how to communicate ad information. For example, block 1120 may comprise determining whether a vehicle will be in communication range for a long enough period of time to perform a desired communication. For example, in an example scenario in which a vehicle will likely be within communication range of a source or destination of ad information for a period of time long enough to perform the desired communication of ad information, block 1120 may comprise determining to perform such communication. Also for example, in an example scenario in which a vehicle will likely not be within communication range of a source or destination for ad information for a long enough period of time, block 1120 may comprise determining to forego the communication or comprise determining to communicate a particular portion of the ad information and leave a remaining portion of the ad information to be communicated by another vehicle. Additionally for example, block 1120 may comprise determining an appropriate data rate (or amount of communication bandwidth) to assign to the communication to ensure its successful completion.

In another example scenario, block 1120 may comprise determining whether current communication conditions allow for at least a minimum data rate needed to complete the communication of ad information to a destination in an allotted amount of time. In yet another example scenario, block 1120 may comprise determining that another vehicle is associated with a context (e.g., location, trajectory, etc.) more conducive to communicating the ad information to the destination and determine to utilize such other vehicle to perform the communication.

In general, block 1120 may comprise analyzing the vehicle context to determine whether and/or how to communicate ad information. Accordingly, the scope of various aspects of the present disclosure should not be limited by characteristics of any particular manner of performing such analyzing or by any particular context aspects.

The example method 1100 may, for example at block 1130, comprise communicating the ad information as determined at block 1130, for example via any of the communication link types discussed herein.

The example method 1100 continues execution at block 1195. Block 1195 may, for example, comprise directing execution flow of the example method 1100 back to any previous block of the example method 1100. Block 1195 may also, for example, comprise directing execution flow of the example method 1100 to any block (or step) of any method discussed herein.

Figure 12:
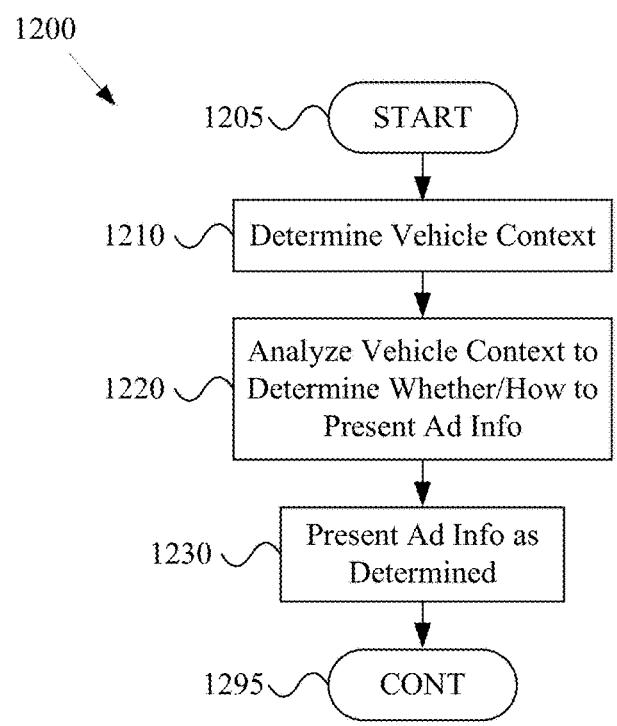
FIG. 12 shows a flow diagram of an example method of communicating and/or presenting advertising information, in accordance with various aspects of the present disclosure.

FIG. 12 shows a flow diagram of an example method of communicating and/or presenting advertising information, in accordance with various aspects of the present disclosure. The example method 1200 may, for example, share any or all characteristics with the other example methods, networks and/or network components 100-1100 and 1300-1500, discussed herein. For example, any or all aspects of the example method 1200 may be performed by a Mobile AP and/or any or all of the nodes discussed herein (e.g., Fixed APs, Network Controllers, cellular base stations, Cloud servers, displays or media presentation devices, user devices, etc.).

The example method 1200 begins executing at block 1205. The example method 1200 may begin executing in response to any of a variety of initiating causes or conditions, non-limiting examples of which are provided herein. For example, the example method 1200 may begin executing in response to a power-up or reset condition, a user command, a command from a Network Controller or other node of a network, a detected environmental condition, etc. Also for example, the example method 1200 may execute periodically and/or continually. Additionally for example, block 1205 may receive execution flow from any other method or method step (or block) discussed herein.

The example method 1200 may, at block 1210, comprise determining a vehicle context. For example, block 1210 may comprise determining the context of a vehicle communicating and/or presenting ad content as discussed herein. Such a vehicle may, for example, comprise any of the types of vehicles discussed herein, for example carrying one or more Mobile APs.

Block 1210 may, for example, comprise determining any or all of the vehicle context parameters discussed herein (e.g., actual or planned location, actual or planned trajectory or route, type of vehicle, fleet identification, wireless environment, power supply characteristics, other vehicles (or Mobile APs thereof) within communication range, weather conditions, road conditions, time-of-day, day-of-week, type of day, number of passengers, passenger identities, whether the vehicle is stopping, whether the vehicle is at a stop light, whether the vehicle is approaching an obstruction, traffic jam, or slow traffic, the orientation of the vehicle relative to other vehicles and/or pedestrian traffic, etc.). Block 1210 may comprise determining the vehicle context in any of a variety of manners. For example, Block 1210 may comprise determining vehicle context based on on-board vehicle sensors or systems, based on information received from other vehicles and/or communication network nodes, based on information received from sensors on-board or off-board the vehicle, based on information received from end user devices, etc.).

Block 1220 may, for example, comprise analyzing the vehicle context determined at block 1210 (e.g., alone or in conjunction with other information) to determine whether and/or how to present ad information (e.g., on a particular display or group thereof, on an audio presentation system, on a splash page, on a stationary display, etc.).

In an example scenario, block 1220 may comprise analyzing vehicle speed and determining that the vehicle is stopped (or traveling below a threshold speed level, or traveling with a speed pattern above a threshold variance level, etc.). Block 1220 may thus comprise determining to present ad content on one or more exterior displays of the vehicle. In another example scenario, block 1220 may comprise analyzing vehicle speed and determining that the vehicle is traveling at a speed having characteristics of stop-and-go traffic (or widely varying speed indicative of an accordion-style traffic pattern, etc.). Block 1220 may thus comprise determining to refrain from presenting information on one or more exterior displays of the vehicle to reduce distractions to other drivers. Block 1220 may similarly comprise analyzing traffic density (e.g., camera information, traffic report information, etc.) to determine whether to display or refrain from displaying ad content on an external display of the vehicle. Block 1220 may, for example, comprise determining to cease presentation of ad content on an exterior display when the vehicle is approaching stopped or high-density traffic.

Block 1220 may also, for example, comprise determining the type of content to present on a display based, at least in part, on vehicle speed. For example, block 1220 may comprise determining to present moving image content when a vehicle is stopped, and static image content when the vehicle is moving.

In an example scenario, block 1220 may comprise analyzing road conditions and determining that road conditions are too hazardous (e.g., too slippery, too rough, etc.) to present ad content on an external display of the vehicle (e.g., on a side of the vehicle facing other traveling vehicles, etc.). Conversely, block 1220 may comprise determining that road conditions are good enough to allow the external presentation of ad content.

In another example scenario, block 1220 may comprise analyzing weather conditions and determining that visibility is too low to present add content on an external display of the vehicle. In yet another example scenario, block 1220 may comprise analyzing the time-of-day and determining that particular ad content should be displayed versus other content.

In an example scenario, block 1220 may comprise analyzing vehicle trajectory (e.g., actual trajectory, predicted trajectory, location and/or speed and/or direction, etc.) and determining to present particular ad content based on a geographic region being entered or left. For example, different ad content may be presented with entering a geographical region versus when leaving the geographical region. Block 1220 may also, for example, comprise analyzing vehicle orientation, lane position, etc., and determining to present ad content on a display of the vehicle facing a sidewalk and/or pedestrian traffic while not presenting the ad content (or displaying different content) on a display of the vehicle facing vehicle traffic. Block 1220 may additionally, for example, comprise analyzing geographical location, vehicle trajectory, and/or vehicle orientation and determining to present first ad content on a front vehicle display (and/or side vehicle display facing vehicles heading into a geographical region) and second ad content on a rear vehicle display (and/or side vehicle display facing vehicles heading away from a geographical region).

In another example scenario, block 1220 may comprise analyzing a vehicle braking signal and determining to modify ad content presentation (e.g., on one or more or all vehicle displays) when a vehicle is stopping (e.g., to augment brake lights, etc.) and/or when a vehicle discontinues stopping.

In an additional example scenario, block 1220 may comprise analyzing vehicle location and determining that a bus stop (or train station, or destination address, etc.) is being approached. Block 1220 may then, for example, comprise determining to replace a portion or all ad content on an interior display (or superimpose a message over ad content) to notify passengers that the bus stop is being approached. Also for example, block 1220 may comprise analyzing vehicle location and determining that the vehicle is in or approaching a construction zone (or other region associated with a need for caution). Block 1220 may comprise refraining from displaying ad content when the vehicle is approaching and/or in the construction zone. Also for example, block 1220 may comprise determining to continue displaying ad content while changing the type of content being displayed (e.g., switching from moving and/or flashing content to still content, etc.).

In a further example scenario, block 1220 may comprise analyzing traffic control information (or sensor information, etc.) and determining that the vehicle is approaching a traffic control light that is red or about to turn red (or a stop sign, etc.). Block 1220 may then comprise determining to discontinue presentation of ad content on one or more exterior displays of the vehicle, for example as an indication to other vehicles (or drivers thereof) that a traffic event is imminent.

Block 1220 may also comprise analyzing characteristics of other vehicles and determining whether and/or how to present ad information based, at least in part, on such characteristics. In an example scenario, block 1220 may comprise determining that all vehicles within a particular range are autonomous (e.g., less susceptible to distraction, etc.) and thus determining to present any ad content on external displays of the vehicle. In another example scenario, block 1220 may comprise determining that a nearby vehicle is being controlled by an on-board driver (e.g., that may be distracted by ad content or particular ad content) and thus determining to refrain from presenting ad content (or particular types of ad content) until the nearby vehicle moves away.

In another example scenario, block 1220 may comprise analyzing the location, speed, and/or trajectory of other vehicles and determining whether and/or how to present ad information based at least in part on such analysis. For example, block 1220 may comprise refraining to presenting ad content on a rear display of a vehicle when another vehicle is tail-gaiting, driving too close or fast for conditions, etc. Also for example, block 1220 may comprise determining to refrain from presenting ad content on one or more displays of the vehicle (e.g., a rear display, etc.) until another vehicle that is behind the vehicle has come to a complete stop, at which point block 1220 may comprise determining to resume presenting the ad content.

Though many of the examples present herein may refer to the operation of particular displays (e.g., exterior and/or interior vehicle displays), the scope of this disclosure is not limited thereto. For example, any or all of the examples provided herein may extend to the operation of off-vehicle displays (e.g., billboards, MUPIs, splash pages, etc.).

It should be understood that the examples presented herein are merely examples, and the scope of the present disclosure is not limited by particular characteristics of such examples.

The various aspects of the present invention also provide for a plurality of vehicles to operate in a coordinated matter when presenting and/or communicating ad content. For example, as discussed herein, there may be vehicle context situations in which a vehicle may present ad content on an external display facing a sidewalk but not a roadway. In such a scenario, the vehicle (or other node) may communicate with a second vehicle that has a display facing a second sidewalk on the other side of the roadway to present ad content on a display facing the second sidewalk. Such coordinated presentation of ad content may, for example, beneficially provide the ad content to pedestrians on each side of the roadway while not distracting drivers on the roadway.

In another example scenario, for example in which particular ad information is to be presented in a geographical region for a particular total amount of time, a first vehicle may present the ad information for a first portion of the total amount of time, and report the first portion to another vehicle (or other network node), and a second vehicle that is in or entering the geographical region may then present the ad information for a second portion of the total amount of time.

In general, block 1220 may comprise analyzing the vehicle context to determine whether and/or how to present ad information. Accordingly, the scope of various aspects of the present disclosure should not be limited by characteristics of any particular manner of performing such analyzing or by any particular context aspects.

The example method 1200 may, for example at block 1230, comprise presenting the ad information as determined at block 1230.

The example method 1200 continues execution at block 1295. Block 1295 may, for example, comprise directing execution flow of the example method 1200 back to any previous block of the example method 1200. Block 1295 may also, for example, comprise directing execution flow of the example method 1200 to any block (or step) of any method discussed herein.

Figure 13:
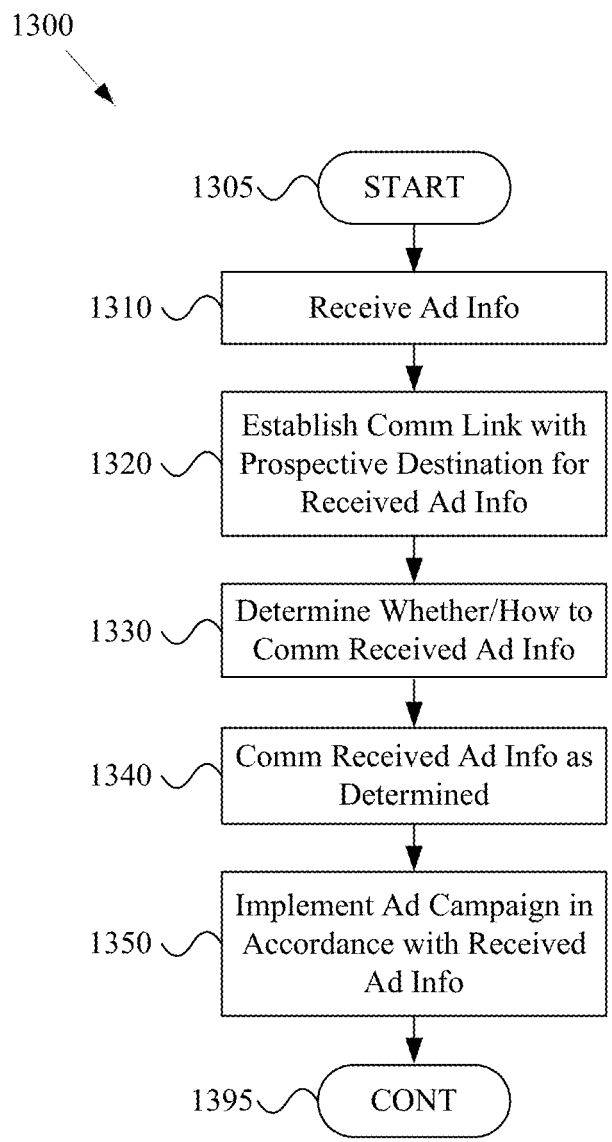
FIG. 13 shows a flow diagram of an example method of presenting advertising information, in accordance with various aspects of the present disclosure.

FIG. 13 shows a flow diagram of an example method of presenting advertising information, in accordance with various aspects of the present disclosure. The example method 1300 may, for example, share any or all characteristics with the other example methods, networks and/or network components 100-1200 and 1400-1500, discussed herein. For example, any or all aspects of the example method 1300 may be performed by a Mobile AP and/or any or all of the nodes discussed herein (e.g., Fixed APs, Network Controllers, cellular base stations, Cloud servers, displays or media presentation devices, user devices, etc.).

The example method 1300 begins executing at block 1305. The example method 1300 may begin executing in response to any of a variety of initiating causes or conditions, non-limiting examples of which are provided herein. For example, the example method 1300 may begin executing in response to a power-up or reset condition, a user command, a command from a Network Controller or other node of a network, a detected environmental condition, etc. Also for example, the example method 1300 may execute periodically and/or continually. Additionally for example, block 1305 may receive execution flow from any other method or method step discussed herein.

The example method 1300 may, at block 1310, comprise receiving ad information (e.g., from a Mobile AP, from a Fixed AP, from a cellular base station, from a display, from a user device, from a Cloud server, etc.). The ad information may, for example, comprise media content to be presented, along with any of the ad campaign control information (e.g., CDFs, etc.) discussed herein. Block 1310 may comprise receiving the ad information in any of a variety of manners (e.g., wirelessly utilizing any of the techniques discussed herein, via tether/untethered optical link, via wired link, etc.).

The example method 1300 may, at block 1320, comprise establishing a communication link with a prospective destination for the ad information received at block 1310. For example, in an example scenario, block 1320 may comprise a Mobile AP that received ad information at block 1310 establishing a communication link with a prospective destination node (e.g., another Mobile AP of the same or another vehicle or portion thereof, an ad info display, a Fixed AP, a user device, etc.). Such a communication link and/or the establishment thereof may share characteristics with any of the communication links and/or the establishment thereof, discussed herein.

The example method 1300 may, at block 1330, comprise determining whether and/or how to communicate the received ad information to other nodes (e.g., to a Mobile AP, to a display or other media presentation device, to a Fixed AP, to a cellular base station, to a user device, etc.).

Block 1330 may, for example, comprise determining whether and/or how to communicate the received ad information to other nodes in any of a variety of manners, non-limiting examples of which are discussed herein. For example, block 1330 may comprise performing such determining based at least in part on vehicle context, for example as discussed herein with regard to the example method 1100 of FIG. 11. Also for example, block 1330 may comprise performing such determining based on any or a variety of other criteria, many non-limiting examples of which are provided herein (e.g., user ID, user group ID, vehicle ID, time, day, etc.). Further for example, block 1330 may comprise determining whether to communicate the received ad information based on whether the prospective destination already has already received the ad information and/or the latest version of the ad information (e.g., as determined over a communication link established with the prospective destination node, etc.). Additionally for example, block 1330 may comprise determining whether to communicate the received ad information based on whether the prospective destination has the necessary storage capacity for the ad information and/or on whether the prospective destination has the communication capability necessary to receive the ad information. Also for example, block 1330 may comprise determining whether to communicate the received ad information based on whether the prospective destination has the ability to present the ad information and/or the ability to perform the ad campaign in accordance with the specified ad campaign instructions (e.g., performing the required filtering, etc.).

In general, block 1330 may comprise determining whether and/or how to communicate received ad information. Accordingly, the scope of various aspects of the present disclosure should not be limited by characteristics of any particular manner of performing such determining or by any particular factors considered while performing such determining.

The example method 1300 may, for example at block 1340, comprise communicating the ad information as determined at block 1330.

The example method 1300 may, at block 1350, comprise implementing the ad campaign in accordance with the ad information (e.g., as received at block 1310). Many non-limiting examples of implementing an ad campaign have been provided herein. Block 1350 may also, for example, share any or all characteristics with the example method 1200 of FIG. 12. Block 1350 may, for example, comprising implementing the ad campaign at any of the network nodes discussed herein (e.g., at a vehicle interior and/or exterior display, at a user device, at a billboard at a MUPI, etc.).

Note that block 1350 may comprise refraining from implementing the ad campaign. For example, any of the nodes of the communication networks discussed herein may perform functionality related to the communication of ad information, but need not present the ad information. For example, a Mobile AP (or any node discussed herein) may be utilized to distribute ad information to media presentation devices (e.g., billboards, MUPIs, etc.) independent of the vehicle carrying the Mobile AP, but not necessarily present the ad information on (or to) displays of the vehicle and/or to passengers of the vehicle. Similarly, a stationary ad presentation system (e.g., a billboard, MUPI, etc.) and/or a user device may be utilized to distribute ad information to other nodes (e.g., to Mobile APs, user devices, other stationary ad presentation systems, etc.) without itself presenting the ad information to users.

The example method 1300 continues execution at block 1395. Block 1395 may, for example, comprise directing execution flow of the example method 1300 back to any previous block of the example method 1300. Block 1395 may also, for example, comprise directing execution flow of the example method 1300 to any block (or step) of any method discussed herein.

Figure 14:
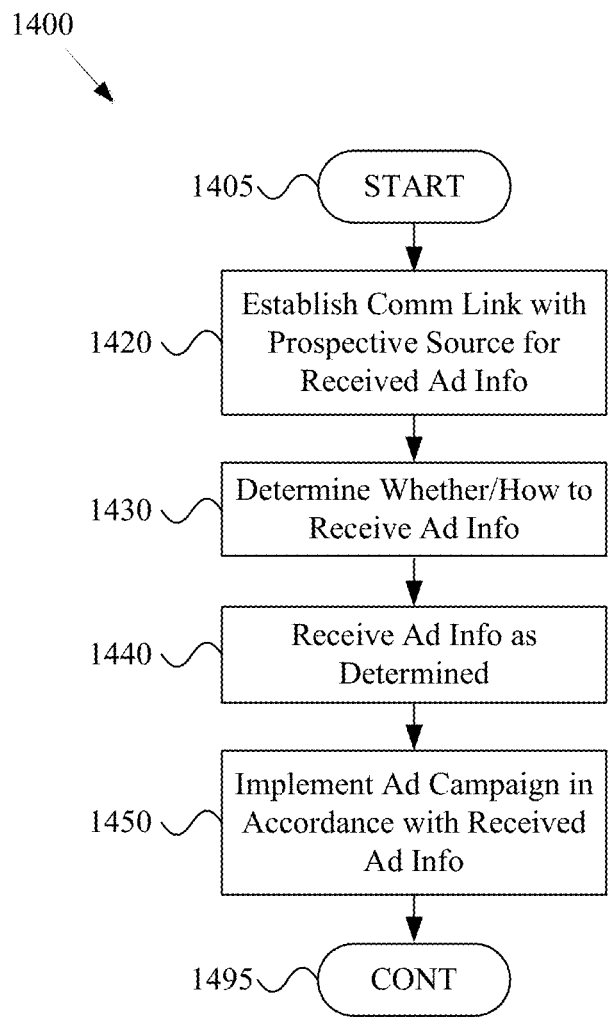
FIG. 14 shows a flow diagram of an example method of communication and/or presenting advertising information, in accordance with various aspects of the present disclosure.

FIG. 14 shows a flow diagram of an example method of communication and/or presenting advertising information, in accordance with various aspects of the present disclosure. The example method 1400 may, for example, share any or all characteristics with the other example methods, networks and/or network components 100-1300 and 1500, discussed herein. For example, any or all aspects of the example method 1400 may be performed by an ad presentation device, by Mobile AP, and/or by any or all of the nodes discussed herein (e.g., Fixed APs, Network Controllers, cellular base stations, Cloud servers, user devices, etc.).

The example method 1400 begins executing at block 1405. The example method 1400 may begin executing in response to any of a variety of initiating causes or conditions, non-limiting examples of which are provided herein. For example, the example method 1400 may begin executing in response to a power-up or reset condition, a user command, a command from a Network Controller or other node of a network, a detected environmental condition, etc. Also for example, the example method 1400 may execute periodically and/or continually. Additionally for example, block 1405 may receive execution flow from any other method or method step (or block) discussed herein.

The example method 1400 may, at block 1420, comprise establishing a communication link with a prospective source for the ad information to be received at block 1440. For example, in an example scenario, block 1420 may comprise an ad display device and/or Mobile AP establishing a communication link with a prospective source node (e.g., another Mobile AP of the same or another vehicle or portion thereof, an ad info display, a Fixed AP, a user device, a cellular base station, etc.). Such a communication link and/or the establishment thereof may share characteristics with any of the communication links and/or the establishment thereof, discussed herein.

The example method 1400 may, at block 1430, comprise determining whether and/or how to receive ad information from another node (e.g., from a Mobile AP, to a display or other media presentation device, from a Fixed AP, from a cellular base station, from a user device, etc.).

Block 1430 may, for example, comprise determining whether and/or how to receive ad information from other nodes in any of a variety of manners, non-limiting examples of which are discussed herein. For example, block 1430 may comprise performing such determining based at least in part on vehicle context, for example as discussed herein with regard to the example method 1100 of FIG. 11. Also for example, block 1430 may comprise performing such determining based on any or a variety of other criteria, many non-limiting examples of which are provided herein (e.g., user ID, user group ID, vehicle ID, time, day, etc.). Further for example, block 1430 may comprise determining whether to receive the ad information based on whether the node already has received the ad information and/or the latest version of the ad information. Additionally for example, block 1430 may comprise determining whether to communicate the received ad information based on whether the node has the necessary storage capacity for the ad information and/or on whether the node has the communication capability necessary to receive the ad information. Also for example, block 1430 may comprise determining whether to receive the ad information based on whether the node has the ability to present the ad information and/or the ability to perform the ad campaign in accordance with the specified ad control instructions (e.g., performing the required filtering, etc.).

In general, block 1430 may comprise determining whether and/or how to receive the ad information. Accordingly, the scope of various aspects of the present disclosure should not be limited by characteristics of any particular manner of performing such determining or by any particular factors considered while performing such determining.

The example method 1400 may, for example at block 1440, comprise receiving the ad information as determined at block 1430.

The example method 1400 may, at block 1450, comprise implementing the ad campaign in accordance with the ad information (e.g., as received at block 1440). Many non-limiting examples of implementing an ad campaign have been provided herein. Block 1550 may also, for example, share any or all characteristics with the example method 1200 of FIG. 12. Block 1550 may, for example, comprising implementing the ad campaign at any of the network nodes discussed herein (e.g., at a vehicle interior and/or exterior display, at a user device, at a billboard at a MUPI, etc.).

The example method 1400 continues execution at block 1495. Block 1495 may, for example, comprise directing execution flow of the example method 1400 back to any previous block of the example method 1400. Block 1495 may also, for example, comprise directing execution flow of the example method 1400 to any block (or step) of any method discussed herein.

Figure 15:
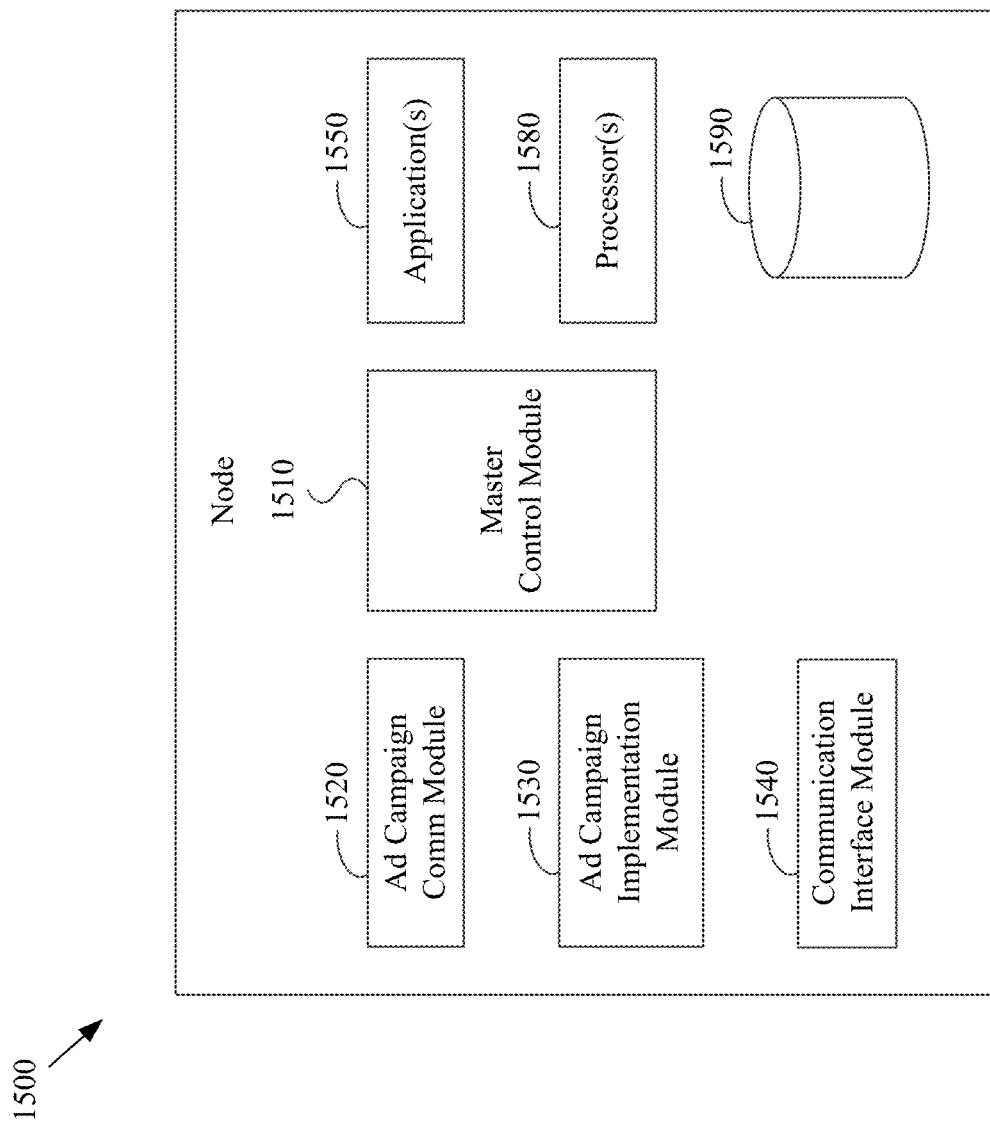
FIG. 15 shows a block diagram of an example communication network node, in accordance with various aspects of the present disclosure.

FIG. 15 shows a block diagram of various components of an example communication network node, in accordance with various aspects of the present disclosure. The example node 1500 may, for example, share any or all characteristics with the other example methods, networks and/or network components 100-1400, discussed herein. For example, any or all of the components of the example node 1500 may perform any or all of the method steps presented herein.

The example node 1500 may, for example, comprise a Mobile AP, Fixed AP, a media presentation system (e.g., billboard, MUPI, Mobility Controller, Network Operations Center, Cloud server, Internet Server, client device, user device, audio output system or loudspeaker, etc.)

The example node 1500 may, for example, comprise a communication interface module 1540 that operates to perform any or all of the wireless and/or wired communication functionality for the node 1500, many examples of which are provided herein (e.g., communication with MCs, communication with Fixed AP nodes, communication with Mobile AP nodes, communication with media (or advertising content) presentation systems, communication directly with client devices, backhaul communication, Cloud server communication, etc.). The communication I/F (interface) module 1540 may, for example, operate in accordance with any of a variety of cellular communication protocols, wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), TCP/IP, etc. For example, any of the example communication discussed herein between a Mobile AP and a media display system (e.g., on-board or off-board a vehicle, etc.), between a user device and a Mobile AP or Fixed AP or other base station, between a Mobile AP and a Fixed AP, between a Mobile AP and an MC, between a Mobile AP and a Fixed or Mobile AP, between a Network Operations Center and any other node, between a Cloud server and any other node, etc., may be performed utilizing the communication interface module 1540.

The example node 1500 also comprises an Ad Campaign (or information) Communication Module 1520. The Ad Campaign Communication Module 1520 may, for example, operate to perform any or all of the advertising information communication functionality discussed herein (e.g., at a Mobile AP, Fixed AP, media presentation system (for example, display, billboard, MUPI, etc.), cellular base station, Cloud server, user device, etc.). The Ad Campaign Communication Module 1520 may, for example, utilize communication functionality provided by the Communication Interface Module 1540.

The example node 1500 also comprises an Ad Campaign Implementation Module 1530. The Ad Campaign Implementation Module 1530 may, for example, operate to perform any or all of the ad campaign implementation functionality (e.g., ad content display, filtering functionality, etc.) discussed herein (e.g., at a Mobile AP, Fixed AP, media presentation system (for example, display, MUPI, billboard, etc.), cellular base station, Cloud server, user device, etc.).

The example node 1500 may, for example, comprise a Master Control Module 1510 that generally manages operation of the node 1500 at a high level. Such Master Control Module 1510 may, for example, comprise various aspects of an operating system for the node 1500.

The example node 1500 may further, for example, comprise one or more applications 1550 executing on the node 1500 (e.g., ad communication and/or implementation applications, security applications, power management applications, vehicle monitoring or context determining applications, location services applications, user interface applications, etc.).

The example node 1500 may also comprise one or more processors 1580 and memory devices 1590. The processor(s) 1580 may, for example, comprise any of a variety of processor characteristics. For example, the processor(s) 1580 may comprise one or more of a general purpose processor, RIS processor, microcontroller, ASIC, DSP, video processor, etc.). The memory device(s) 1590 may, for example comprise any of a variety of memory characteristics. For example, the memory device(s) 1590 may comprise a volatile memory, non-volatile memory, etc. The memory device(s) 1590 may, for example, comprise a non-transitory computer-readable medium that comprises software instructions that when executed by the processor(s) 1580, cause the node 1500 to perform any or all of the functionality discussed herein (e.g., with regard to the example methods discussed herein, etc.). The memory device(s) 1590 may also, for example, comprises a non-transitory and/or transitory computer readable medium that stores advertising information, advertising content, ad campaign control information, etc.

Systems and methods implemented in accordance with various aspects of this disclosure may provide a variety of benefits. For example, utilizing (or leveraging) vehicle context information to decide how, when and where ad campaigns are communicated and/or displayed in the several distribution channels provides for efficient and effective distribution and presentation of the ad campaigns. Also, a unique platform has been provided herein with which to distribute digital advertising campaigns for vehicles and advertising assets in the surroundings of the vehicles as the vehicles circulate around. Additionally, unique metrics and analytics about digital advertising campaigns may be collected, for example using data that is timestamped with vehicle context, GPS, vehicle position, speed, number of other users in the presentation envelope, etc.

In summary, various aspects of this disclosure provide communication network architectures, systems and methods for managing digital advertising campaigns in a network of moving things. As a non-limiting example, vehicle mobility and/or context may be utilized to effectively distribute and control distribution of ad campaigns. Additionally, various aspects of this disclosure provide systems and methods by which such ad campaigns may be specified (or defined) by a user. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope.

Therefore, it is intended that the disclosure not be limited to the particular example(s) disclosed, but that the disclosure will include all examples falling within the scope of the appended claims.

What is claimed is:

1. A method for presenting advertising information, the method comprising:
in a Mobile Access Point (MAP) of a vehicle, the MAP configured to provide Wireless Local Area Network (WLAN) services to client devices in the vehicle and configured to provide Internet access to said client devices through at least a vehicle communication network, at least:
receiving advertising information from a source node of the vehicle communication network;
determining context of the vehicle;
determining based on analyzing of the context of the vehicle, how to present at a first portion of the received advertising information on a first display of the vehicle and a second portion of the received advertising information, different from the first portion, on a second display of the vehicle; and
managing simultaneous presentation of the first and second portions of the received advertising information on the first and second displays.

2. The method of claim 1, wherein the vehicle context comprises vehicle speed.

3. The method of claim 1, wherein the vehicle context comprises vehicle trajectory.

4. The method of claim 1, wherein:
the vehicle context comprises vehicle orientation; and
said analyzing the context of the vehicle comprises determining whether the first display is oriented to face pedestrian traffic.

5. The method of claim 1, wherein the vehicle context comprises vehicle travel conditions, the vehicle travel conditions comprising weather.

6. The method of claim 1, comprising analyzing another vehicle's context, and determining based on analyzing of the another vehicle's context how to present the first portion of the received advertising information on the first display of the vehicle.

7. The method of claim 6, wherein said analyzing another vehicle's context comprises determining whether the another vehicle is operating autonomously.

8. The method of claim 1, wherein said advertising information comprises a distribution list of vehicles.

9. The method of claim 1, further comprising collecting data describing an amount of user exposure to at least a portion of the advertising information.

10. The method of claim 1, wherein the vehicle context comprises proximity to a construction zone.

11. A method for presenting media information, the method comprising:
in a Mobile Access Point (MAP) of a vehicle, the MAP different from an end user device, the MAP configured to provide Wireless Local Area Network (WLAN) services to client devices in the vehicle and configured to provide Internet access to said client devices through at least a vehicle communication network, at least:
receiving advertising information from a second node of the vehicle communication network, the advertising information comprising advertising information to be presented to a user;
determining context of the vehicle;
determining based on analyzing of the context of the vehicle, how to communicate the received advertising information to a third node of the communication network, where the third node is independent of the MAP and the vehicle; and
communicating the received advertising information to the third node of the communication network.

12. The method of claim 11, comprising:
determining based on analyzing of the context of the vehicle, how to present at least a first portion of the received advertising information on a first display of the vehicle and a second portion of the received advertising information, different from the first portion, on a second display of the vehicle; and
managing simultaneous presentation of the first portion of the received advertising information on the first display and the second portion of the received advertising information on the second display.

13. The method of claim 11, wherein the second node comprises a second Mobile Access Point (MAP) of a second vehicle, the second MAP different from an end user device and configured to provide Wireless Local Area Network (WLAN) services to second client devices in the second vehicle and configured to provide Internet access to the second client devices through at least the vehicle communication network.

14. The method of claim 13, wherein the third node comprises a third Mobile Access Point (MAP) of a third vehicle, the third MAP different from an end user device and configured to provide Wireless Local Area Network (WLAN) services to third client devices in the third vehicle and configured to provide Internet access to the third client devices through at least the vehicle communication network.

15. The method of claim 11, wherein the second node comprises a video display system independent of the vehicle.

16. The method of claim 13, wherein the third node comprises a stationary advertisement display system.

17. A communication network node comprising:
a Mobile Access Point (MAP) of a vehicle, the MAP configured to provide Wireless Local Area Network (WLAN) services to client devices in the vehicle and configured to provide Internet access to said client devices through at least a vehicle communication network, the MAP comprising:
at least one module comprising a processing circuit, at least one wireless transceiver, and a memory and being operable to, at least:
receive advertising information from a source node of the vehicle communication network;
determine context of the vehicle;
determine based on analyzing of the context of the vehicle how to present a first portion of the received advertising information on a first display of the vehicle and a second portion of the received advertising information, different from the first portion, on a second display of the vehicle; and
manage simultaneous presentation of the first and second portions of the received advertising information on the first and second displays.

18. The node of claim 17, wherein the vehicle context comprises vehicle speed.

19. The node of claim 17, wherein the vehicle context comprises vehicle trajectory.

20. The node of claim 17, wherein:
the vehicle context comprises vehicle orientation; and the at least one module is operable to analyze the context of the vehicle by, at least in part, operating to determine whether the first display is oriented to face pedestrian traffic.

21. The node of claim 17, wherein the vehicle context comprises vehicle travel conditions, the vehicle travel conditions comprising weather.

22. The node of claim 17, wherein the at least one module is operable to analyze another vehicle's context, and
determining based on analyzing of the context of the vehicle's context, how to present the first portion of the received advertising information on the first display of the vehicle.

23. The node of claim 22, wherein the at least one module is operable to, when analyzing the another vehicle's context determine whether the another vehicle is operating autonomously.

24. The node of claim 17, wherein said advertising information comprises a distribution list of vehicles.

25. The node of claim 17, wherein the at least one module is further operable to collect data describing an amount of user exposure to at least a portion of the advertising information.

26. The node of claim 17, wherein the vehicle context comprises proximity to a construction zone.

27. A communication network node comprising:
a Mobile Access Point (MAP) of a vehicle, the MAP different from an end user device, the MAP configured to provide Wireless Local Area Network (WLAN) services to client devices in the vehicle and configured to provide Internet access to said client devices through at least a vehicle communication network, the MAP comprising:
at least one module comprising a processing circuit, at least one wireless transceiver, and a memory and being operable to, at least:
receive advertising information from a second node of a communication network, the advertising information comprising advertising information to be presented to a user:
determine context of the vehicle;
analyze the context of the vehicle;
determining based on analyzing of the context of the vehicle, how to communicate the received advertising information to a third node of the communication network, where the third node is independent of the MAP and the vehicle; and
communicate the received advertising information to the third node of the communication network.

28. The node of claim 27, wherein the at least one module is operable to:
analyze the context of the vehicle to determine how to present at least a first portion of the received advertising information on a first display of the vehicle and a second portion of the received advertising information, different from the first portion, on a second display of the vehicle; and
manage simultaneous presentation of the first portion of the received advertising information on the first display and the second portion of the received advertising information on the second display.

29. The node of claim 27, wherein the second node comprises a second Mobile Access Point (MAP) of a second vehicle, the second MAP different from an end user device and configured to provide Wireless Local Area Network (WLAN) services to second client devices in the second vehicle and configured to provide Internet access to the second client devices through at least the vehicle communication network.

30. The node of claim 29, wherein the third node comprises a third Mobile Access Point (MAP) of a third vehicle, the third MAP different from an end user device and configured to provide Wireless Local Area Network (WLAN) services to third client devices in the third vehicle and configured to provide Internet access to the third client devices through at least the vehicle communication network.

31. The node of claim 29, wherein the third node comprises a stationary advertisement display system.

32. The node of claim 27, wherein the second third node comprises a video display system independent of the vehicle.

* * * * *